US010304478B2

(12) United States Patent
Wang

(10) Patent No.: US 10,304,478 B2
(45) Date of Patent: May 28, 2019

(54) METHOD FOR DETECTING AUDIO SIGNAL AND APPARATUS

(71) Applicant: HUAWEI TECHNOLOGIES CO., LTD., Shenzhen, Guangdong (CN)

(72) Inventor: Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 262 days.

(21) Appl. No.: 15/262,263

(22) Filed: Sep. 12, 2016

(65) Prior Publication Data

US 2016/0379670 A1 Dec. 29, 2016

Related U.S. Application Data

(63) Continuation of application No. PCT/CN2014/092694, filed on Dec. 1, 2014.

(30) Foreign Application Priority Data

Mar. 12, 2014 (CN) .......................... 2014 1 0090386

(51) Int. Cl.
*G10L 15/00* (2013.01)
*G10L 25/78* (2013.01)
*G10L 25/18* (2013.01)

(52) U.S. Cl.
CPC .............. *G10L 25/78* (2013.01); *G10L 25/18* (2013.01); *G10L 2025/783* (2013.01)

(58) Field of Classification Search
CPC ....................................................... G10L 15/00
(Continued)

(56) References Cited

U.S. PATENT DOCUMENTS 5,706,394 A * 1/1998 Wynn ................. G10L 21/0208 704/219
5,963,901 A * 10/1999 Vahatalo ............. G10L 21/0208 704/218
(Continued)

FOREIGN PATENT DOCUMENTS

CN 1918461 A 2/2007
CN 101379548 A 3/2009
(Continued)

OTHER PUBLICATIONS

Martin Vondrasek et al., "Methods for speech SNR estimation: Evaluation tool and analysis of VAD dependency," Radioengineering 14(1):6-11, Apr. 2005, total 6 pages.
(Continued)

*Primary Examiner* — Michael C Colucci
(74) *Attorney, Agent, or Firm* — Huawei Technologies Co., Ltd.

(57) ABSTRACT

Embodiments disclosed herein provide a method for detecting an audio signal and an apparatus, where the method includes determining an input audio signal as a to-be-determined audio signal; determining an enhanced segmental signal-to-noise ratio (SSNR) of the audio signal, where the enhanced SSNR is greater than a reference SSNR; and comparing the enhanced SSNR with a voice activity detection (VAD) decision threshold to determine whether the audio signal is an active signal. According to the method and the apparatus provided in the embodiments, an active voice and an inactive voice can be accurately distinguished.

8 Claims, 5 Drawing Sheets

(58) Field of Classification Search
USPC ................... 704/9, 235, 217, 208, 207, 205; 455/456.1, 67.11
See application file for complete search history.

(56) References Cited

U.S. PATENT DOCUMENTS

| | | | | |
|---|---|---|---|---|
| 5,991,718 | A * | 11/1999 | Malah | G10L 25/78 704/208 |
| 6,453,291 | B1 | 9/2002 | Ashley | |
| 6,898,566 | B1 * | 5/2005 | Benyassine | G10L 19/22 704/207 |
| 7,024,353 | B2 * | 4/2006 | Ramabadran | G10L 25/78 704/205 |
| 7,162,420 | B2 * | 1/2007 | Zangi | G10L 21/02 375/232 |
| 8,175,877 | B2 | 5/2012 | Gilbert et al. | |
| 8,204,754 | B2 * | 6/2012 | Sehlstedt | G10L 19/0204 704/500 |
| 8,442,817 | B2 * | 5/2013 | Naka | G10L 25/78 704/207 |
| 8,898,058 | B2 * | 11/2014 | Shin | G10L 25/78 704/205 |
| 2002/0077813 | A1 * | 6/2002 | Erell | G10L 15/20 704/233 |
| 2003/0061042 | A1 | 3/2003 | Garudadri et al. | |
| 2005/0143989 | A1 | 6/2005 | Jelinek | |
| 2008/0249771 | A1 * | 10/2008 | Wahab | G10L 25/78 704/233 |
| 2009/0089053 | A1 * | 4/2009 | Wang | G10L 25/78 704/233 |
| 2009/0319262 | A1 * | 12/2009 | Gupta | G10L 19/22 704/207 |
| 2010/0088094 | A1 * | 4/2010 | Wang | G10L 25/78 704/233 |
| 2011/0029305 | A1 | 2/2011 | Jung et al. | |
| 2011/0184734 | A1 * | 7/2011 | Wang | G10L 25/78 704/233 |
| 2011/0264449 | A1 | 10/2011 | Sehlstedt | |
| 2011/0312342 | A1 * | 12/2011 | Eguchi | H04L 1/0026 455/456.1 |
| 2012/0173247 | A1 * | 7/2012 | Sung | G10L 19/002 704/500 |
| 2012/0232896 | A1 * | 9/2012 | Taleb | G10L 25/78 704/233 |
| 2012/0278068 | A1 | 11/2012 | Wang | |
| 2013/0191117 | A1 | 7/2013 | Atti et al. | |
| 2013/0218559 | A1 * | 8/2013 | Yamabe | G10L 21/0216 704/226 |
| 2013/0282373 | A1 | 10/2013 | Visser et al. | |
| 2013/0304464 | A1 * | 11/2013 | Wang | G10L 25/78 704/233 |
| 2015/0187364 | A1 | 7/2015 | Sehlstedt | |
| 2015/0221322 | A1 * | 8/2015 | Iyengar | G10L 25/84 704/226 |
| 2016/0171976 | A1 * | 6/2016 | Sun | H04W 52/0251 704/233 |
| 2016/0379670 | A1 * | 12/2016 | Wang | G10L 25/18 704/233 |

FOREIGN PATENT DOCUMENTS

| | | | |
|---|---|---|---|
| CN | 102044242 | A | 5/2011 |
| CN | 102044243 | A | 5/2011 |
| CN | 102576528 | A | 7/2012 |
| CN | 102741918 | A | 10/2012 |
| CN | 102959625 | A | 3/2013 |
| EP | 2113908 | A1 | 11/2009 |
| JP | S59182498 | A | 10/1984 |
| JP | H09204196 | A | 8/1997 |
| JP | 2001236085 | A | 8/2001 |
| JP | 2001265367 | A | 9/2001 |
| RU | 2291499 | C2 | 1/2007 |
| RU | 2329550 | C2 | 7/2008 |
| RU | 2450368 | C2 | 5/2012 |
| WO | 2007/091956 | A2 | 8/2007 |
| WO | 2010/091339 | A1 | 8/2010 |

OTHER PUBLICATIONS

ITU-T G.720.1, Telecommunication Standardization Sectorof ITU, Series G: Transmission Systems and Media, Digital Systems and Networks, Digital terminal equipments—Coding of voice and audiosignals, Generic sound activity detector. Jan. 2010. Total 34 pages.

Weiwu, Jiang et al., "A New Voice Activity Detection Method Using Maximized Sub-band SNR," Audio Language and Image Processing (ICALIP), 2010 International Conference on IEEE, Piscataway, NJ, USA, Nov. 23, 2010. pp. 80-84. XP031847414.

* cited by examiner

METHOD FOR DETECTING AUDIO SIGNAL AND APPARATUS

CROSS-REFERENCE TO RELATED APPLICATIONS

This application is a continuation of International Application No. PCT/CN2014/092694, filed on Dec. 1, 2014, which claims priority to Chinese Patent Application No. 201410090386.X, filed on Mar. 12, 2014, both of which are hereby incorporated by reference in their entireties.

TECHNICAL FIELD

Embodiments of the present invention relate to the field of signal processing technologies, and more specifically, to a method for detecting an audio signal and an apparatus.

BACKGROUND

Voice activity detection (VAD) is a key technology widely used in fields such as voice communications and man-machine interaction. The VAD may also be referred to as sound activity detection (SAD). The VAD is used to detect whether there is an active signal in an input audio signal, where the active signal is relative to an inactive signal (such as environmental background noise and a mute voice). Typical active signals include a voice, music, and the like. A principle of the VAD is that one or more feature parameters are extracted from an input audio signal, one or more feature values are determined according to the one or more feature parameters, and then the one or more feature values are compared with one or more thresholds.

In the prior art, an active signal detection method based on a segmental signal-to-noise ratio (SSNR) includes: dividing an input audio signal into multiple sub-band signals on a frequency band, calculating energy of the audio signal on each sub-band, and comparing the energy of the audio signal on each sub-band with estimated energy of a background noise signal on each sub-band, so as to obtain a signal-to-noise ratio (SNR) of the audio signal on each sub-band; and then determining an SSNR according to a sub-band SNR of each sub-band, and comparing the SSNR with a preset VAD decision threshold, where if the SSNR exceeds the VAD decision threshold, the audio signal is an active signal, or if the SSNR does not exceed the VAD decision threshold, the audio signal is an inactive signal.

A typical method for calculating the SSNR is to add up all sub-band SNRs of the audio signal, and a result obtained is the SSNR. For example, the SSNR may be determined using formula 1.1:

$$SSNR = \sum_{k=0}^{N-1} snr(k) \quad \text{Formula 1.1}$$

where k indicates the $k^{th}$ sub-band, snr(k) indicates a sub-band SNR of the $k^{th}$ sub-band, and N indicates a total quantity of sub-bands into which the audio signal is divided.

When the foregoing method for calculating the SSNR is used to detect an active voice, misdetection of an active voice may occur.

SUMMARY

Embodiments disclosed herein provide a method for detecting an audio signal and an apparatus, which can accurately distinguish between an active voice and an inactive voice.

According to a first aspect, an embodiment provides a method for detecting an audio signal, where the method includes: determining an input audio signal as a to-be-determined audio signal; determining an enhanced segmental signal-to-noise ratio (SSNR) of the audio signal, where the enhanced SSNR is greater than a reference SSNR; and comparing the enhanced SSNR with a voice activity detection (VAD) decision threshold to determine whether the audio signal is an active signal.

With reference to the first aspect, in a first possible implementation manner of the first aspect, the determining an input audio signal as a to-be-determined audio signal includes: determining the audio signal as a to-be-determined audio signal according to a sub-band signal-to-noise ratio (SNR) of the audio signal.

With reference to the first possible implementation manner of the first aspect, in a second possible implementation manner of the first aspect, the determining an input audio signal as a to-be-determined audio signal includes: determining the audio signal as a to-be-determined audio signal in a case in which a quantity of high-frequency end sub-bands that are in the audio signal and whose sub-band SNRs are greater than a first preset threshold is greater than a first quantity.

With reference to the first possible implementation manner of the first aspect, in a third possible implementation manner of the first aspect, the determining an input audio signal as a to-be-determined audio signal includes: determining the audio signal as a to-be-determined audio signal in a case in which a quantity of high-frequency end sub-bands that are in the audio signal and whose sub-band SNRs are greater than a first preset threshold is greater than a second quantity, and a quantity of low-frequency end sub-bands that are in the audio signal and whose sub-band SNRs are less than a second preset threshold is greater than a third quantity.

With reference to the first possible implementation manner of the first aspect, in a fourth possible implementation manner of the first aspect, the determining an input audio signal as a to-be-determined audio signal includes: determining the audio signal as a to-be-determined audio signal in a case in which a quantity of sub-bands that are in the audio signal and whose values of sub-band SNRs are greater than a third preset threshold is greater than a fourth quantity.

With reference to the first aspect, in a fifth possible implementation manner of the first aspect, the determining an input audio signal as a to-be-determined audio signal includes: determining the audio signal as a to-be-determined audio signal in a case in which it is determined that the audio signal is an unvoiced signal.

With reference to the second possible implementation manner or the third possible implementation manner of the first aspect, in a sixth possible implementation manner of the first aspect, the determining an enhanced SSNR of the audio signal includes: determining a weight of a sub-band SNR of each sub-band in the audio signal, where a weight of a sub-band SNR of a high-frequency end sub-band whose sub-band SNR is greater than the first preset threshold is greater than a weight of a sub-band SNR of another sub-band; and determining the enhanced SSNR according to the sub-band SNR of each sub-band and the weight of the sub-band SNR of each sub-band in the audio signal.

With reference to the first aspect or any possible implementation manner of the first possible implementation manner of the first aspect to the fifth possible implementation manner of the first aspect, in a seventh possible implementation manner of the first aspect, the determining an enhanced SSNR of the audio signal includes: determining a reference SSNR of the audio signal; and determining the enhanced SSNR according to the reference SSNR of the audio signal.

With reference to the seventh possible implementation manner of the first aspect, in an eighth possible implementation manner of the first aspect, the determining the enhanced SSNR according to the reference SSNR of the audio signal includes: determining the enhanced SSNR using the following formula: SSNR'=x*SSNR+y, where SSNR indicates the reference SSNR, SSNR' indicates the enhanced SSNR, and x and y indicate enhancement parameters.

With reference to the seventh possible implementation manner of the first aspect, in a ninth possible implementation manner of the first aspect, the determining the enhanced SSNR according to the reference SSNR of the audio signal includes: determining the enhanced SSNR using the following formula: SSNR'=f(x)*SSNR+h(y), where SSNR indicates the reference SSNR, SSNR' indicates the enhanced SSNR, and f(x) and h(y) indicate enhancement functions.

With reference to the first aspect or any one of the foregoing possible implementation manners of the first aspect, in a tenth possible implementation manner of the first aspect, before the comparing the enhanced SSNR with a VAD decision threshold, the method further includes: using a preset algorithm to reduce the VAD decision threshold, so as to obtain a reduced VAD decision threshold; and the comparing the enhanced SSNR with a VAD decision threshold to determine whether the audio signal is an active signal includes: comparing the enhanced SSNR with the reduced VAD decision threshold to determine whether the audio signal is an active signal.

According to a second aspect, an embodiment provides a method for detecting an audio signal, where the method includes: determining an input audio signal as a to-be-determined audio signal; determining a weight of a sub-band SNR of each sub-band in the audio signal, where a weight of a sub-band SNR of a high-frequency end sub-band whose sub-band SNR is greater than a first preset threshold is greater than a weight of a sub-band SNR of another sub-band; determining an enhanced SSNR according to the sub-band SNR of each sub-band and the weight of the sub-band SNR of each sub-band in the audio signal, where the enhanced SSNR is greater than a reference SSNR; and comparing the enhanced SSNR with a VAD decision threshold to determine whether the audio signal is an active signal.

With reference to the second aspect, in a first possible implementation manner of the second aspect, the determining an input audio signal as a to-be-determined audio signal includes: determining the audio signal as a to-be-determined audio signal according to a sub-band SNR of the audio signal.

With reference to the first possible implementation manner of the second aspect, in a second possible implementation manner of the second aspect, the determining an input audio signal as a to-be-determined audio signal includes: determining the audio signal as a to-be-determined audio signal in a case in which a quantity of high-frequency end sub-bands that are in the audio signal and whose sub-band SNRs are greater than the first preset threshold is greater than a first quantity.

With reference to the first possible implementation manner of the second aspect, in a third possible implementation manner of the second aspect, the determining an input audio signal as a to-be-determined audio signal includes: determining the audio signal as a to-be-determined audio signal in a case in which a quantity of high-frequency end sub-bands that are in the audio signal and whose sub-band SNRs are greater than the first preset threshold is greater than a second quantity, and a quantity of low-frequency end sub-bands that are in the audio signal and whose sub-band SNRs are less than a second preset threshold is greater than a third quantity.

According to a third aspect, an embodiment provides a method for detecting an audio signal, where the method includes: determining an input audio signal as a to-be-determined audio signal; acquiring a reference SSNR of the audio signal; using a preset algorithm to reduce a reference VAD decision threshold, so as to obtain a reduced VAD decision threshold; and comparing the reference SSNR with the reduced VAD decision threshold to determine whether the audio signal is an active signal.

With reference to the third aspect, in a first possible implementation manner of the third aspect, the determining an input audio signal as a to-be-determined audio signal includes: determining the audio signal as a to-be-determined audio signal according to a sub-band SNR of the audio signal.

With reference to the first possible implementation manner of the third aspect, in a second possible implementation manner of the third aspect, the determining an input audio signal as a to-be-determined audio signal includes: determining the audio signal as a to-be-determined audio signal in a case in which a quantity of high-frequency end sub-bands that are in the audio signal and whose sub-band SNRs are greater than a first preset threshold is greater than a first quantity.

With reference to the first possible implementation manner of the third aspect, in a third possible implementation manner of the third aspect, the determining an input audio signal as a to-be-determined audio signal includes: determining the audio signal as a to-be-determined audio signal in a case in which a quantity of high-frequency end sub-bands that are in the audio signal and whose sub-band SNRs are greater than a first preset threshold is greater than a second quantity, and a quantity of low-frequency end sub-bands that are in the audio signal and whose sub-band SNRs are less than a second preset threshold is greater than a third quantity.

With reference to the first possible implementation manner of the third aspect, in a fourth possible implementation manner of the third aspect, the determining an input audio signal as a to-be-determined audio signal includes: determining the audio signal as a to-be-determined audio signal in a case in which a quantity of sub-bands that are in the audio signal and whose values of sub-band SNRs are greater than a third preset threshold is greater than a fourth quantity.

With reference to the third aspect, in a fifth possible implementation manner of the third aspect, the determining an input audio signal as a to-be-determined audio signal includes: determining the audio signal as a to-be-determined audio signal in a case in which it is determined that the audio signal is an unvoiced signal.

According to a fourth aspect, an embodiment provides an apparatus, where the apparatus includes: a first determining unit, configured to determine an input audio signal as a to-be-determined audio signal; a second determining unit, configured to determine an enhanced SSNR of the audio signal, where the enhanced SSNR is greater than a reference SSNR; and a third determining unit, configured to compare the enhanced SSNR with a VAD decision threshold to determine whether the audio signal is an active signal.

With reference to the fourth aspect, in a first possible implementation manner of the fourth aspect, the first determining unit is configured to determine the audio signal as a to-be-determined audio signal according to a sub-band signal-to-noise ratio SNR of the audio signal.

With reference to the first possible implementation manner of the fourth aspect, in a second possible implementation manner of the fourth aspect, the first determining unit is configured to determine the audio signal as a to-be-determined audio signal in a case in which a quantity of high-frequency end sub-bands that are in the audio signal and whose sub-band SNRs are greater than a first preset threshold is greater than a first quantity.

With reference to the first possible implementation manner of the fourth aspect, in a third possible implementation manner of the fourth aspect, the first determining unit is configured to determine the audio signal as a to-be-determined audio signal in a case in which a quantity of high-frequency end sub-bands that are in the audio signal and whose sub-band SNRs are greater than a first preset threshold is greater than a second quantity, and a quantity of low-frequency end sub-bands that are in the audio signal and whose sub-band SNRs are less than a second preset threshold is greater than a third quantity.

With reference to the first possible implementation manner of the fourth aspect, in a fourth possible implementation manner of the fourth aspect, the first determining unit is configured to determine the audio signal as a to-be-determined audio signal in a case in which a quantity of sub-bands that are in the audio signal and whose values of sub-band SNRs are greater than a third preset threshold is greater than a fourth quantity.

With reference to the fourth aspect, in a fifth possible implementation manner of the fourth aspect, the first determining unit is configured to determine the audio signal as a to-be-determined audio signal in a case in which it is determined that the audio signal is an unvoiced signal.

With reference to the second possible implementation manner of the fourth aspect or the third possible implementation manner of the fourth aspect, in a sixth possible implementation manner of the fourth aspect, the second determining unit is configured to determine a weight of a sub-band SNR of each sub-band in the audio signal, where a weight of a sub-band SNR of a high-frequency end sub-band whose sub-band SNR is greater than the first preset threshold is greater than a weight of a sub-band SNR of another sub-band; and determine the enhanced SSNR according to the sub-band SNR of each sub-band and the weight of the sub-band SNR of each sub-band in the audio signal.

With reference to the fourth aspect or any possible implementation manner of the first possible implementation manner of the fourth aspect to the fifth possible implementation manner of the fourth aspect, in a seventh possible implementation manner of the fourth aspect, the second determining unit is configured to determine a reference SSNR of the audio signal; and determine the enhanced SSNR according to the reference SSNR of the audio signal.

With reference to the seventh possible implementation manner of the fourth aspect, in an eighth possible implementation manner of the fourth aspect, the second determining unit is configured to determine the enhanced SSNR using the following formula: SSNR'=x*SSNR+y, where SSNR indicates the reference SSNR, SSNR' indicates the enhanced SSNR, and x and y indicate enhancement parameters.

With reference to the seventh possible implementation manner of the fourth aspect, in a ninth possible implementation manner of the fourth aspect, the second determining unit is configured to determine the enhanced SSNR using the following formula: SSNR'=f (x)*SSNR+h(y), where SSNR indicates the reference SSNR, SSNR' indicates the enhanced SSNR, and f(x) and h(y) indicate enhancement functions.

With reference to the fourth aspect or any one of the foregoing possible implementation manners of the fourth aspect, in a tenth possible implementation manner of the fourth aspect, the apparatus further includes a fourth determining unit, where the fourth determining unit is configured to use a preset algorithm to reduce the VAD decision threshold, so as to obtain a reduced VAD decision threshold; and the third determining unit is configured to compare the enhanced SSNR with the reduced VAD decision threshold to determine whether the audio signal is an active signal.

According to a fifth aspect, an embodiment provides an apparatus, where the apparatus includes: a first determining unit, configured to determine an input audio signal as a to-be-determined audio signal; a second determining unit, configured to determine a weight of a sub-band SNR of each sub-band in the audio signal, where a weight of a sub-band SNR of a high-frequency end sub-band whose sub-band SNR is greater than a first preset threshold is greater than a weight of a sub-band SNR of another sub-band, and determine an enhanced SSNR according to the sub-band SNR of each sub-band and the weight of the sub-band SNR of each sub-band in the audio signal, where the enhanced SSNR is greater than a reference SSNR; and a third determining unit, configured to compare the enhanced SSNR with a VAD decision threshold to determine whether the audio signal is an active signal.

With reference to the fifth aspect, in a first possible implementation manner of the fifth aspect, the first determining unit is configured to determine the audio signal as a to-be-determined audio signal according to a sub-band signal-to-noise ratio SNR of the audio signal.

With reference to the first possible implementation manner of the fifth aspect, in a second possible implementation manner of the fifth aspect, the first determining unit is configured to determine the audio signal as a to-be-determined audio signal in a case in which a quantity of high-frequency end sub-bands that are in the audio signal and whose sub-band SNRs are greater than the first preset threshold is greater than a first quantity.

With reference to the first possible implementation manner of the fifth aspect, in a third possible implementation manner of the fifth aspect, the first determining unit is configured to determine the audio signal as a to-be-determined audio signal in a case in which a quantity of high-frequency end sub-bands that are in the audio signal and whose sub-band SNRs are greater than the first preset threshold is greater than a second quantity, and a quantity of low-frequency end sub-bands that are in the audio signal and whose sub-band SNRs are less than a second preset threshold is greater than a third quantity.

According to a sixth aspect, an embodiment provides an apparatus, where the apparatus includes: a first determining unit, configured to determine an input audio signal as a to-be-determined audio signal; a second determining unit, configured to acquire a reference SSNR of the audio signal; a third determining unit, configured to use a preset algorithm to reduce a reference VAD decision threshold, so as to obtain a reduced VAD decision threshold; and a fourth determining unit, configured to compare the reference SSNR with the reduced VAD decision threshold to determine whether the audio signal is an active signal.

With reference to the sixth aspect, in a first possible implementation manner of the sixth aspect, the first determining unit is configured to determine the audio signal as a to-be-determined audio signal according to a sub-band SNR of the audio signal.

With reference to the first possible implementation manner of the sixth aspect, in a second possible implementation manner of the sixth aspect, the first determining unit is configured to determine the audio signal as a to-be-determined audio signal in a case in which a quantity of high-frequency end sub-bands that are in the audio signal and whose sub-band SNRs are greater than a first preset threshold is greater than a first quantity.

With reference to the first possible implementation manner of the sixth aspect, in a third possible implementation manner of the sixth aspect, the first determining unit is configured to determine the audio signal as a to-be-determined audio signal in a case in which a quantity of high-frequency end sub-bands that are in the audio signal and whose sub-band SNRs are greater than a first preset threshold is greater than a second quantity, and a quantity of low-frequency end sub-bands that are in the audio signal and whose sub-band SNRs are less than a second preset threshold is greater than a third quantity.

With reference to the first possible implementation manner of the sixth aspect, in a fourth possible implementation manner of the sixth aspect, the first determining unit is configured to determine the audio signal as a to-be-determined audio signal in a case in which a quantity of sub-bands that are in the audio signal and whose values of sub-band SNRs are greater than a third preset threshold is greater than a fourth quantity.

With reference to the sixth aspect, in a fifth possible implementation manner of the sixth aspect, the first determining unit is configured to determine the audio signal as a to-be-determined audio signal in a case in which it is determined that the audio signal is an unvoiced signal.

According to the method provided in the embodiments disclosed herein, a feature of an audio signal may be determined, an enhanced SSNR is determined in a corresponding manner according to the feature of the audio signal, and the enhanced SSNR is compared with a VAD decision threshold, so that a proportion of misdetection of an active signal can be reduced.

BRIEF DESCRIPTION OF DRAWINGS

To describe the technical solutions in the embodiments more clearly, the following briefly describes the accompanying drawings required for describing the embodiments. Apparently, the accompanying drawings in the following description show merely some embodiments, and a person of ordinary skill in the art may still derive other drawings from these accompanying drawings without creative efforts.

DESCRIPTION OF EMBODIMENTS

The following clearly describes the technical solutions in the embodiments disclosed herein, with reference to the accompanying drawings. The described embodiments are merely some but not all of the embodiments. All other embodiments obtained by a person of ordinary skill in the art based on the embodiments herein without creative efforts shall fall within the protection scope of the present description.

Figure 1:
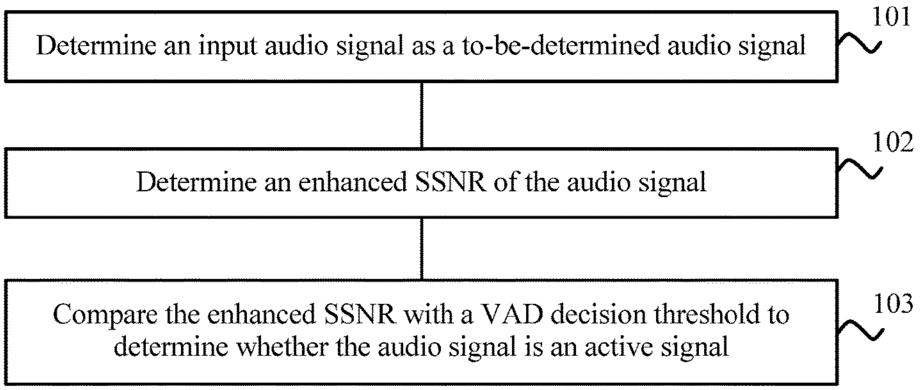
FIG. 1 is a flowchart of a method for detecting an audio signal according to an embodiment.

FIG. 1 is a flowchart of a method for detecting an audio signal according to an embodiment. A manner of properly increasing an SSNR is used so that the SSNR may be greater than a VAD decision threshold. Therefore, misdetections of an active signal can be effectively reduced.

101. Determine an input audio signal as a to-be-determined audio signal.

102. Determine an enhanced segmental signal-to-noise ratio (SSNR) of the audio signal, where the enhanced SSNR is greater than a reference SSNR.

103. Compare the enhanced SSNR with a voice activity detection (VAD) decision threshold to determine whether the audio signal is an active signal.

In this embodiment, when the enhanced SSNR is compared with the VAD decision threshold, a reference VAD decision threshold may be used, or a reduced VAD decision threshold (obtained after a reference VAD decision threshold is reduced using a preset algorithm) may be used. The reference VAD decision threshold may be a default VAD decision threshold. The reference VAD decision threshold may be pre-stored, or may be temporarily obtained through calculation, where the reference VAD decision threshold may be calculated using an existing technology. When the reference VAD decision threshold is reduced using the preset algorithm, the preset algorithm may be multiplying the reference VAD decision threshold by a coefficient that is less than 1, or another algorithm may be used. This embodiment imposes no limitation on a used specific algorithm.

When a conventional SSNR calculation method is used to calculate SSNRs of some audio signals, the SSNRs of these audio signals may be lower than a preset VAD decision threshold. However, these audio signals may actually comprise active audio signals. This is caused by features of these audio signals. For example, in a case in which an environmental SNR is relatively low, a sub-band SNR of a high-frequency part is significantly reduced. In addition, because a psychoacoustic theory is generally used to perform sub-band division, the sub-band SNR of the high-frequency part has relatively low contribution to an SSNR. In this case, for some signals, such as an unvoiced signal whose energy is mainly centralized at a relatively high frequency part, an SSNR obtained through calculation using the conventional SSNR calculation method, may be lower than the VAD decision threshold, which causes misdetection of an active signal. In another example, for some audio signals, distribution of energy of these audio signals is relatively flat on a spectrum but overall energy of these audio signals is relatively low. Therefore, in the case in which an environmental SNR is relatively low, an SSNR obtained through calculation using the conventional SSNR calculation method may be lower than the VAD decision threshold misdetection.

Figure 2:
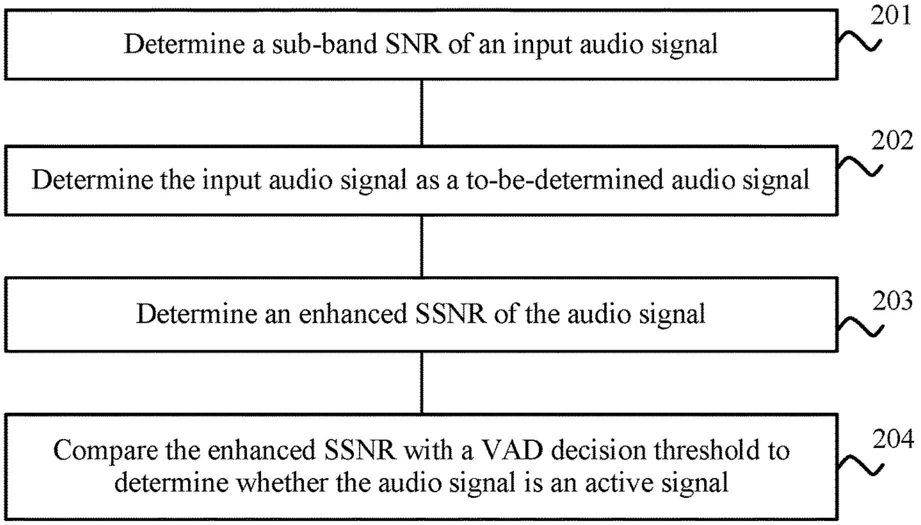
FIG. 2 is a flowchart of a method for detecting an audio signal according to an embodiment.

FIG. 2 is a flowchart of a method for detecting an audio signal according to an embodiment.

201. Determine a sub-band SNR of an input audio signal.

A spectrum of the input audio signal is divided into N sub-bands, where N is a positive integer greater than 1. Specifically, a psychoacoustic theory may be used to divide the spectrum of the audio signal. In a case in which the psychoacoustic theory is used to divide the spectrum of the audio signal, the lower the frequency of a sub-band is, the narrower the bandwidth of the sub-band is, and the higher the frequency of a sub-band is, the wider the bandwidth of the sub-band is Certainly, the spectrum of the audio signal may also be divided in another manner, for example, a manner of evenly dividing the spectrum of the audio signal into N sub-bands. A sub-band SNR of each sub-band of the input audio signal is calculated, where the sub-band SNR is a ratio of energy of the sub-band to energy of background noise on the sub-band. The energy of the background noise on the sub-band generally is an estimated value obtained by estimation by a background noise estimator. How to use the background noise estimator to estimate background noise energy corresponding to each sub-band is a well-known technology of this field. Therefore, no details need to be described herein. A person skilled in the art may understand that the sub-band SNR may be a direct energy ratio, or may be another expression manner of a direct energy ratio, such as a logarithmic sub-band SNR. In addition, a person skilled in the art may further understand that the sub-band SNR may also be a sub-band SNR obtained after linear or nonlinear processing is performed on a direct sub-band SNR, or may be another transformation of the sub-band SNR. The direct energy ratio of the sub-band SNR is shown in the following formula:

$$\mathrm{snr}(k)=E(k)/En(k) \qquad \text{Formula 1.2}$$

where snr(k) indicates a sub-band SNR of the $k^{th}$ sub-band, and E(k) and En(k) respectively indicate energy of the $k^{th}$ sub-band and energy of background noise on the $k^{th}$ sub-band. A logarithmic sub-band SNR may be indicated as: $\mathrm{snr}_{log}(k)=10\times\log_{10}\mathrm{snr}(k)$, where $\mathrm{snr}_{log}(k)$ indicates a logarithmic sub-band SNR of the $k^{th}$ sub-band, and snr(k) indicates a sub-band SNR that is of the $k^{th}$ sub-band and obtained through calculation using formula 1.2. A person skilled in the art may further understand that sub-band energy used to calculate a sub-band SNR may be energy of the input audio signal on a sub-band, or may be energy obtained after energy of the background noise on a sub-band is subtracted from energy of the input audio signal on the sub-band. Calculation of the SNR is proper without departing from meaning of the SNR.

202. Determine the input audio signal as a to-be-determined audio signal.

Optionally, in an embodiment, the determining the input audio signal as a to-be-determined audio signal may include: determining the audio signal as a to-be-determined audio signal according to the sub-band SNR that is of the audio signal and determined in step 201.

Optionally, in an embodiment, in a case in which the audio signal is determined as a to-be-determined audio signal according to the sub-band SNR of the audio signal, the determining the input audio signal as a to-be-determined audio signal includes: determining the audio signal as a to-be-determined audio signal in a case in which a quantity of high-frequency end sub-bands that are in the audio signal and whose sub-band SNRs are greater than a first preset threshold is greater than a first quantity.

Optionally, in another embodiment, in a case in which the audio signal is determined as a to-be-determined audio signal according to the sub-band SNR of the audio signal, the determining the input audio signal as a to-be-determined audio signal includes: determining the audio signal as a to-be-determined audio signal in a case in which a quantity of high-frequency end sub-bands that are in the audio signal and whose sub-band SNRs are greater than a first preset threshold is greater than a second quantity, and a quantity of low-frequency end sub-bands that are in the audio signal and whose sub-band SNRs are less than a second preset threshold is greater than a third quantity. In this embodiment, a high-frequency end and a low-frequency end of one frame of audio signal are relative, that is, a part having a relatively high frequency is the high-frequency end, and a part having a relatively low frequency is the low-frequency end.

Optionally, in another embodiment, in a case in which the audio signal is determined as a to-be-determined audio signal according to the sub-band SNR of the audio signal, the determining the input audio signal as a to-be-determined audio signal includes: determining the audio signal as a to-be-determined audio signal in a case in which a quantity of sub-bands that are in the audio signal and whose values of sub-band SNRs are greater than a third preset threshold is greater than a fourth quantity.

The first preset threshold and the second preset threshold may be obtained by means of statistics collection according to a large quantity of voice samples. Specifically, statistics about sub-band SNRs of high-frequency end sub-bands are collected in a large quantity of unvoiced samples including background noise, and the first preset threshold is determined according to the sub-band SNRs, so that sub-band SNRs of most of the high-frequency end sub-bands in these unvoiced samples are greater than the first preset threshold. Similarly, statistics about sub-band SNRs of low-frequency end sub-bands are collected in these unvoiced samples, and the second preset threshold is determined according to the sub-band SNRs, so that sub-band SNRs of most of the low-frequency end sub-bands in these unvoiced samples are less than the second preset threshold.

The third preset threshold is also obtained by means of statistics collection. Specifically, the third preset threshold is determined according to sub-band SNRs of a large quantity of noise signals, so that sub-band SNRs of most of sub-bands in these noise signals are less than the third preset threshold.

The first quantity, the second quantity, the third quantity, and the fourth quantity are also obtained by means of statistics collection. The first quantity is used as an example, where in a large quantity of unvoiced sample frames including noise, statistics about a sub-band quantity of high-frequency end sub-bands whose sub-band SNRs are greater than the first preset threshold are collected, and the first quantity is determined according to the quantity, so that a quantity of high-frequency end sub-bands that are in most of these unvoiced sample frames and whose sub-band SNRs are greater than the first preset threshold is greater than the first quantity. A method for acquiring the second quantity is similar to a method for acquiring the first quantity. The second quantity may be the same as the first quantity, or the second quantity may be different from the first quantity. Similarly, for the third quantity, in the large quantity of unvoiced sample frames including noise, statistics about a sub-band quantity of low-frequency end sub-bands whose sub-band SNRs are less than the second preset threshold are collected, and the third quantity is determined according to the quantity, so that a quantity of low-frequency end sub-bands that are in most of these unvoiced sample frames and whose sub-band SNRs are less than the second preset threshold is greater than the third quantity. For the fourth quantity, in a large quantity of noise signal frames, statistics about a quantity of sub-bands whose sub-band SNRs are less than the third preset threshold are collected, and the fourth quantity is determined according to the quantity, so that a quantity of sub-bands that are in most of these noise sample frames and whose sub-band SNRs are less than the third preset threshold is greater than the fourth quantity Optionally, in another embodiment, whether the input audio signal is a to-be-determined audio signal may be determined by determining whether the input audio signal is an unvoiced signal. In this case, the sub-band SNR of the audio signal does not need to be determined when whether the audio signal is a to-be-determined audio signal is being determined. In other words, step 201 does not need to be performed in this case. Specifically, the determining the input audio signal as a to-be-determined audio signal includes: determining the audio signal as a to-be-determined audio signal in a case in which it is determined that the audio signal is an unvoiced signal. Specifically, a person skilled in the art may understand that there may be multiple methods for detecting whether the audio signal is an unvoiced signal. For example, whether the audio signal is an unvoiced signal may be determined by detecting a time-domain zero-crossing rate (ZCR) of the audio signal. Specifically, in a case in which the ZCR of the audio signal is greater than a ZCR threshold, it is determined that the audio signal is an unvoiced signal, where the ZCR threshold is determined according to a large quantity of experiments.

203. Determine an enhanced SSNR of the audio signal, where the enhanced SSNR is greater than a reference SSNR.

The reference SSNR may be an SSNR obtained through calculation using formula 1.1. It can be seen from formula 1.1 that weighting processing is not performed on a sub-band SNR of any sub-band when the reference SSNR is being calculated, that is, weights of sub-band SNRs of all sub-bands are equal when the reference SSNR is being calculated.

Optionally, in an embodiment, in a case in which the quantity of high-frequency end sub-bands is greater than the first quantity, where the high-frequency end sub-bands are in the audio signal and the SNRs of the high-frequency end sub-bands are greater than the first preset threshold, or in a case in which the quantity of high-frequency end sub-bands is greater than the second quantity and the quantity of low-frequency end sub-bands is greater than the third quantity, where the high-frequency end sub-bands and the low-frequency end sub-bands are in the audio signal, the SNRs of the high-frequency end sub-bands are greater than the first preset threshold, and the SNRs of the low-frequency end sub-bands are less than the second preset threshold, the step of determining an enhanced SSNR of the audio signal includes: determining a weight of a sub-band SNR of each sub-band in the audio signal, where a weight of a high-frequency end sub-band whose sub-band SNR is greater than the first preset threshold is greater than a weight of a sub-band SNR of another sub-band; and determining the enhanced SSNR according to the sub-band SNR of each sub-band and the weight of the sub-band SNR of each sub-band in the audio signal.

For example, if the audio signal is divided into 20 sub-bands, that is, sub-band 0 to sub-band 19, according to the psychoacoustic theory, and signal-to-noise ratios of sub-band 18 and sub-band 19 are both greater than a first preset value T1, four sub-bands, that is, sub-band 20 to sub-band 23, may be added. Specifically, sub-band 18 and sub-band 19 whose signal-to-noise ratios are greater than T1 may be respectively divided into sub-band 18a, sub-band 18b, and sub-band 18c; and sub-band 19a, sub-band 19b, and sub-band 19c. In this case, sub-band 18 may be considered as a mother sub-band of sub-band 18a, sub-band 18b, and sub-band 18c, and sub-band 19 may be considered as a mother sub-band of sub-band 19a, sub-band 19b, and sub-band 19c. Values of signal-to-noise ratios of sub-band 18a, sub-band 18b, and sub-band 18c are the same as a value of the signal-to-noise ratio of their mother sub-band, and values of signal-to-noise ratios of sub-band 19a, sub-band 19b, and sub-band 19c are the same as a value of the signal-to-noise ratio of their mother sub-band. In this way, the 20 sub-bands that are originally obtained through division are re-divided into 24 sub-bands. Because VAD is designed still according to the 20 sub-bands during active signal detection, the 24 sub-bands need to be mapped back to the 20 sub-bands to determine the enhanced SSNR. In conclusion, when the enhanced SSNR is determined by increasing the quantity of high-frequency end sub-bands whose sub-band SNRs are greater than the first preset threshold, calculation may be performed using the following formula:

$$SSNR' = \frac{20}{24} \times \left[2 \times (snr(18) + snr(19)) + \sum_{k=0}^{19} snr(k)\right] \quad \text{Formula 1.3}$$

where SSNR' indicates the enhanced SSNR, and snr(k) indicates a sub-band SNR of the $k^{th}$ sub-band.

If an SSNR obtained through calculation using formula 1.1 is the reference SSNR, the reference SSNR obtained through calculation is $$\sum_{k=0}^{19} snr(k).$$

Obviously, for an audio signal of a first type, a value of the enhanced SSNR obtained through calculation using formula 1.3 is greater than a value of the reference SSNR obtained through calculation using formula 1.1.

For another example, if the audio signal is divided into 20 sub-bands, that is, sub-band 0 to sub-band 19, according to the psychoacoustic theory, snr(18) and snr(19) are both greater than a first preset value T1, and snr(0) to snr(17) are all less than a second preset threshold T2, the enhanced SSNR may be determined using the following:

$$SSNR' = a_1 \times snr(18) + a_2 \times snr(19) + \sum_{k=0}^{17} snr(k) \quad \text{Formula 1.4}$$

where SSNR' indicates the enhanced SSNR, snr(k) indicates a sub-band SNR of the $k^{th}$ sub-band, $a_1$ and $a_2$ are weight increasing parameters, and values of $a_1$ and $a_2$ make $a_1 \times snr(18) + a_2 \times snr(19)$ greater than snr(18)+snr(19). Obviously, a value of the enhanced SSNR obtained through calculation using formula 1.4 is greater than the value of the reference SSNR obtained through calculation using formula 1.1.

Optionally, in another embodiment, the determining an enhanced SSNR of the audio signal includes: determining a reference SSNR of the audio signal, and determining the enhanced SSNR according to the reference SSNR of the audio signal.

Optionally, the enhanced SSNR may be determined using the following formula:

$$SSNR' = x * SSNR + y \quad \text{Formula 1.5}$$

where SSNR indicates the reference SSNR of the audio signal, SSNR' indicates the enhanced SSNR, and x and y indicate enhancement parameters. For example, a value of x may be 1.05, and a value of y may be 1. A person skilled in the art may understand that, values of x and y may be other proper values that make the enhanced SSNR greater than the reference SSNR properly.

Optionally, the enhanced SSNR may be determined using the following formula:

$$SSNR' = f(x) * SSNR + h(y) \quad \text{Formula 1.6}$$

where SSNR indicates an original SSNR of the audio signal, SSNR' indicates the enhanced SSNR, and f(x) and h(y) indicate enhancement functions. For example, f(x) and h(y) may be functions related to a LSNR of the audio signal, where the LSNR of the audio signal is an average SNR or a weighted SNR within a relatively long period of time. For example, when the lsnr is greater than 20, f(lsnr) may be equal to 1.1, and y(lsnr) may be equal to 2. When the lsnr is less than 20 and greater than 15, f(lsnr) may be equal to 1.05, and y(lsnr) may be equal to 1. When the lsnr is less than 15, f(lsnr) may be equal to 1, and y(lsnr) may be equal to 0. A person skilled in the art may understand that, f(x) and h(y) may be in other proper forms that make the enhanced SSNR greater than the reference SSNR properly.

204. Compare the enhanced SSNR with a VAD decision threshold to determine whether the audio signal is an active signal.

Specifically, when the enhanced SSNR is compared with the VAD decision threshold, if the enhanced SSNR is greater than the VAD decision threshold, it is determined that the audio signal is an active signal. If the enhanced SSNR is not greater than the VAD decision threshold, it is determined that the audio signal is an inactive signal.

Optionally, in another embodiment, before the comparing the enhanced SSNR with a VAD decision threshold, the method may further include: using a preset algorithm to reduce the VAD decision threshold, so as to obtain a reduced VAD decision threshold. In this case, the comparing the enhanced SSNR with a VAD decision threshold includes: comparing the enhanced SSNR with the reduced VAD decision threshold to determine whether the audio signal is an active signal. A reference VAD decision threshold may be a default VAD decision threshold, and the reference VAD decision threshold may be pre-stored, or may be temporarily obtained through calculation, where the reference VAD decision threshold may be calculated using an existing well-known technology. When the reference VAD decision threshold is reduced using the preset algorithm, the preset algorithm may be multiplying the reference VAD decision threshold by a coefficient that is less than 1, or another algorithm may be used. This embodiment imposes no limitation on a specific algorithm being used. The VAD decision threshold may be properly reduced using the preset algorithm, so that the enhanced SSNR is greater than the reduced VAD decision threshold. Therefore, misdetection of an active signal can be reduced.

According to the method shown in FIG. 2, a feature of an audio signal is determined, an enhanced SSNR is determined in a corresponding manner according to the feature of the audio signal, and the enhanced SSNR is compared with a VAD decision threshold. In this way, misdetection of an active signal can be reduced.

Figure 3:
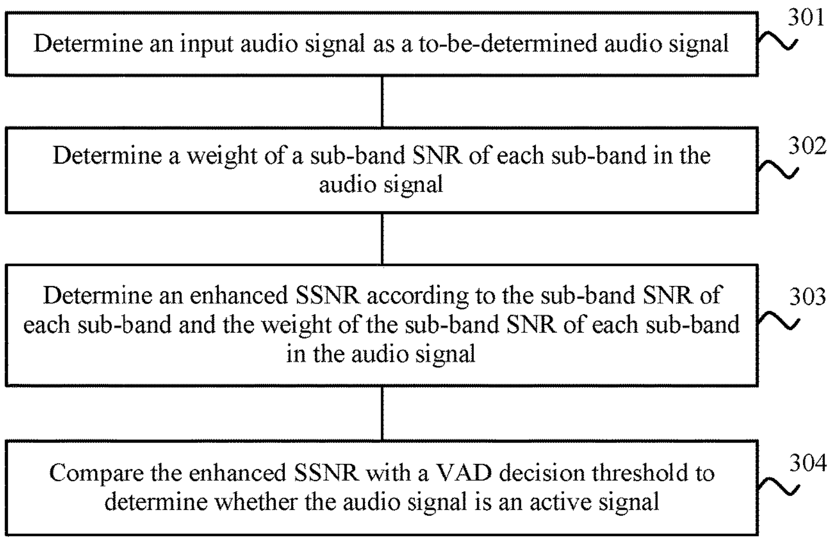
FIG. 3 is a flowchart of a method for detecting an audio signal according to an embodiment.

FIG. 3 is a flowchart of a method for detecting an audio signal according to an embodiment.

301. Determine an input audio signal comprises as a to-be-determined audio signal.

302. Determine a weight of a sub-band SNR of each sub-band in the audio signal, where a weight of a sub-band SNR of a high-frequency end sub-band whose sub-band SNR is greater than a first preset threshold is greater than a weight of a sub-band SNR of another sub-band.

303. Determine an enhanced SSNR according to the sub-band SNR of each sub-band and the weight of the sub-band SNR of each sub-band in the audio signal, where the enhanced SSNR is greater than a reference SSNR.

The reference SSNR may be an SSNR obtained through calculation using formula 1.1. It can be seen from formula 1.1 that weighting processing is not performed on a sub-band SNR of any sub-band when the reference SSNR is being calculated, that is, weights of sub-band SNRs of all sub-bands are equal when the reference SSNR is being calculated.

For example, if the audio signal is divided into 20 sub-bands, that is, sub-band 0 to sub-band 19, according to a psychoacoustic theory, and signal-to-noise ratios of sub-band 18 and sub-band 19 are both greater than a first preset value T1, four sub-bands, that is, sub-band 20 to sub-band 23, may be added. Specifically, sub-band 18 and sub-band 19 whose signal-to-noise ratios are greater than T1 may be respectively divided into sub-band 18a, sub-band 18b, and sub-band 18c; and sub-band 19a, sub-band 19b, and sub-band 19c. In this case, sub-band 18 may be considered as a mother sub-band of sub-band 18a, sub-band 18b, and sub-band 18c, and sub-band 19 may be considered as a mother sub-band of sub-band 19a, sub-band 19b, and sub-band 19c. Values of signal-to-noise ratios of sub-band 18a, sub-band 18b, and sub-band 18c are the same as a value of the signal-to-noise ratio of their mother sub-band, and values of signal-to-noise ratios of sub-band 19a, sub-band 19b, and sub-band 19c are the same as a value of the signal-to-noise ratio of their mother sub-band. In this way, the 20 sub-bands that are originally obtained through division are re-divided into 24 sub-bands. Because VAD is designed still according to the 20 sub-bands during active signal detection, the 24 sub-bands need to be mapped back to the 20 sub-bands to determine the enhanced SSNR. In conclusion, when the enhanced SSNR is determined by increasing a quantity of high-frequency end sub-bands whose sub-band SNRs are greater than the first preset threshold, calculation may be performed by using the following formula:

$$SSNR' = \frac{20}{24} \times \left[ 2 \times (snr(18) + snr(19)) + \sum_{k=0}^{19} snr(k) \right] \quad \text{Formula 1.3}$$

where SSNR' indicates the enhanced SSNR, and snr(k) indicates a sub-band SNR of the $k^{th}$ sub-band.

If an SSNR obtained through calculation by using formula 1.1 is the reference SSNR, the reference SSNR obtained through calculation is $$\sum_{k=0}^{19} snr(k).$$

Obviously, for an audio signal of a first type, a value of the enhanced SSNR obtained through calculation by using formula 1.3 is greater than a value of the reference SSNR obtained through calculation by using formula 1.1.

For another example, if the audio signal is divided into 20 sub-bands, that is, sub-band 0 to sub-band 19, according to the psychoacoustic theory, snr(18) and snr(19) are both greater than a first preset value T1, and snr(0) to snr(17) are all less than a second preset threshold T2, the enhanced SSNR may be determined by using the following formula:

$$SSNR' = a_1 \times snr(18) + a_2 \times snr(19) + \sum_{k=0}^{17} snr(k) \quad \text{Formula 1.4}$$

where SSNR' indicates the enhanced SSNR, snr(k) indicates a sub-band SNR of the $k^{th}$ sub-band, $a_1$ and $a_2$ are weight increasing parameters, and values of $a_1$ and $a_2$ make $a_1 \times snr(18)+a_2 \times snr(19)$ greater than snr(18)+snr(19). Obviously, a value of the enhanced SSNR obtained through calculation by using formula 1.4 is greater than the value of the reference SSNR obtained through calculation by using formula 1.1.

304. Compare the enhanced SSNR with a VAD decision threshold to determine whether the audio signal is an active signal.

Specifically, when the enhanced SSNR is compared with the VAD decision threshold, if the enhanced SSNR is greater than the VAD decision threshold, it is determined that the audio signal is an active signal; or if the enhanced SSNR is not greater than the VAD decision threshold, it is determined that the audio signal is an inactive signal.

According to the method shown in FIG. 3, a feature of an audio signal may be determined, an enhanced SSNR is determined in a corresponding manner according to the feature of the audio signal, and the enhanced SSNR is compared with a VAD decision threshold. Therefore, misdetection of an active signal can be reduced.

Further, the determining an input audio signal as a to-be-determined audio signal includes: determining the audio signal as a to-be-determined audio signal according to a sub-band SNR of the audio signal.

Optionally, in an embodiment, in a case in which the audio signal is determined as a to-be-determined audio signal according to the sub-band SNR of the audio signal, the determining the audio signal as a to-be-determined audio signal includes: determining the audio signal as a to-be-determined audio signal in a case in which a quantity of high-frequency end sub-bands that are in the audio signal and whose sub-band SNRs are greater than the first preset threshold is greater than a first quantity.

Optionally, in another embodiment, in a case in which the audio signal is determined as a to-be-determined audio signal according to the sub-band SNR of the audio signal, the step of determining the audio signal as a to-be-determined audio signal includes: determining the audio signal as a to-be-determined audio signal in a case in which a quantity of high-frequency end sub-bands is greater than a second quantity and a quantity of low-frequency end sub-bands is greater than a third quantity, where the high-frequency end sub-bands and the low-frequency end sub-bands are in the audio signal, the SNRs of the high-frequency end sub-bands are greater than the first preset threshold, and the SNRs of the low-frequency end sub-bands are less than a second preset threshold.

The first preset threshold and the second preset threshold may be obtained by means of statistics collection according to a large quantity of voice samples. Specifically, statistics about sub-band SNRs of high-frequency end sub-bands are collected in a large quantity of unvoiced samples including background noise, and the first preset threshold is determined according to the sub-band SNRs, so that sub-band SNRs of most of the high-frequency end sub-bands in these unvoiced samples are greater than the first preset threshold. Similarly, statistics about sub-band SNRs of low-frequency end sub-bands are collected in these unvoiced samples, and the second preset threshold is determined according to the sub-band SNRs, so that sub-band SNRs of most of the low-frequency end sub-bands in these unvoiced samples are less than the second preset threshold.

The first quantity, the second quantity, and the third quantity are also obtained by means of statistics collection. The first quantity is used as an example, where in a large quantity of unvoiced sample frames including noise, statistics about a sub-band quantity of high-frequency end sub-bands whose sub-band SNRs are greater than the first preset threshold are collected, and the first quantity is determined according to the quantity, so that a quantity of high-frequency end sub-bands that are in most of these unvoiced sample frames and whose sub-band SNRs are greater than the first preset threshold is greater than the first quantity. A method for acquiring the second quantity is similar to a method for acquiring the first quantity. The second quantity may be the same as the first quantity, or the second quantity may be different from the first quantity. Similarly, for the third quantity, in the large quantity of unvoiced sample frames including noise, statistics about a sub-band quantity of low-frequency end sub-bands whose sub-band SNRs are less than the second preset threshold are collected, and the third quantity is determined according to the quantity, so that a quantity of low-frequency end sub-bands that are in most of these unvoiced sample frames and whose sub-band SNRs are less than the second preset threshold is greater than the third quantity.

In embodiments of FIG. 1 to FIG. 3, whether an input audio signal is an active signal is determined in a manner of using an enhanced SSNR. In a method shown in FIG. 4, whether an input audio signal is an active signal is determined in a manner of reducing a VAD decision threshold.

Figure 4:
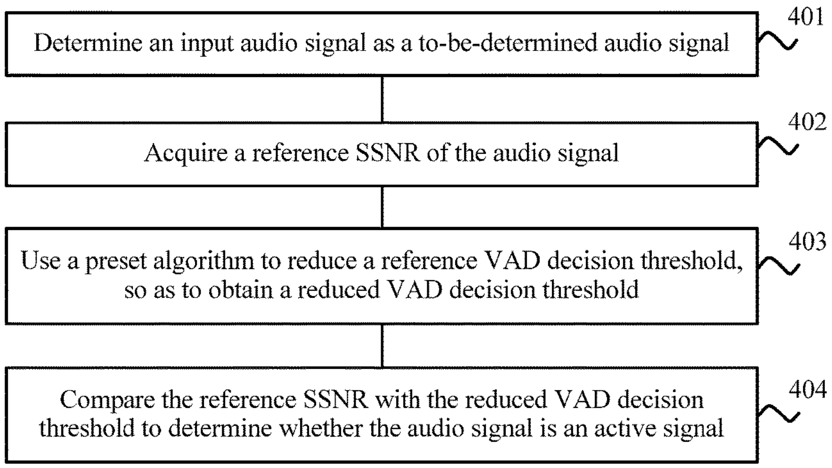
FIG. 4 is a flowchart of a method for detecting an audio signal according to an embodiment.

FIG. 4 is a flowchart of a method for detecting an audio signal according to an embodiment.

401. Determine an input audio signal as a to-be-determined audio signal.

Optionally, in an embodiment, the determining an input audio signal as a to-be-determined audio signal includes: determining the audio signal as a to-be-determined audio signal according to the sub-band SNR that is of the audio signal and determined in step 201.

Optionally, in an embodiment, in a case in which the audio signal is determined as a to-be-determined audio signal according to the sub-band SNR of the audio signal, the determining an input audio signal as a to-be-determined audio signal includes: determining the audio signal as a to-be-determined audio signal in a case in which a quantity of high-frequency end sub-bands that are in the audio signal and whose sub-band SNRs are greater than a first preset threshold is greater than a first quantity.

Optionally, in another embodiment, in a case in which the audio signal is determined as a to-be-determined audio signal according to the sub-band SNR of the audio signal, the determining an input audio signal as a to-be-determined audio signal includes: determining the audio signal as a to-be-determined audio signal in a case in which a quantity of high-frequency end sub-bands that are in the audio signal and whose sub-band SNRs are greater than a first preset threshold is greater than a second quantity, and a quantity of low-frequency end sub-bands that are in the audio signal and whose sub-band SNRs are less than a second preset threshold is greater than a third quantity.

Optionally, in another embodiment, in a case in which the audio signal is determined as a to-be-determined audio signal according to the sub-band SNR of the audio signal, the determining an input audio signal as a to-be-determined audio signal includes: determining the audio signal as a to-be-determined audio signal in a case in which a quantity of sub-bands that are in the audio signal and whose values of sub-band SNRs are greater than a third preset threshold is greater than a fourth quantity.

The first preset threshold and the second preset threshold may be obtained by means of statistics collection according to a large quantity of voice samples. Specifically, statistics about sub-band SNRs of high-frequency end sub-bands are collected in a large quantity of unvoiced samples including background noise, and the first preset threshold is determined according to the sub-band SNRs, so that sub-band SNRs of most of the high-frequency end sub-bands in these unvoiced samples are greater than the first preset threshold. Similarly, statistics about sub-band SNRs of low-frequency end sub-bands are collected in these unvoiced samples, and the second preset threshold is determined according to the sub-band SNRs, so that sub-band SNRs of most of the low-frequency end sub-bands in these unvoiced samples are less than the second preset threshold.

The third preset threshold is also obtained by means of statistics collection. Specifically, the third preset threshold is determined according to sub-band SNRs of a large quantity of noise signals, so that sub-band SNRs of most of sub-bands in these noise signals are less than the third preset threshold.

The first quantity, the second quantity, the third quantity, and the fourth quantity are also obtained by means of statistics collection. The first quantity is used as an example, where in a large quantity of unvoiced sample frames including noise, statistics about a sub-band quantity of high-frequency end sub-bands whose sub-band SNRs are greater than the first preset threshold are collected, and the first quantity is determined according to the quantity, so that a quantity of high-frequency end sub-bands that are in most of these unvoiced sample frames and whose sub-band SNRs are greater than the first preset threshold is greater than the first quantity. A method for acquiring the second quantity is similar to a method for acquiring the first quantity. The second quantity may be the same as the first quantity, or the second quantity may be different from the first quantity. Similarly, for the third quantity, in the large quantity of unvoiced sample frames including noise, statistics about a sub-band quantity of low-frequency end sub-bands whose sub-band SNRs are less than the second preset threshold are collected, and the third quantity is determined according to the quantity, so that a quantity of low-frequency end sub-bands that are in most of these unvoiced sample frames and whose sub-band SNRs are less than the second preset threshold is greater than the third quantity. For the fourth quantity, in a large quantity of noise signal frames, statistics about a quantity of sub-bands whose sub-band SNRs are less than the third preset threshold are collected, and the fourth quantity is determined according to the quantity, so that a quantity of sub-bands that are in most of these noise sample frames and whose sub-band SNRs are less than the third preset threshold is greater than the fourth quantity Optionally, in another embodiment, whether the input audio signal is a to-be-determined audio signal may be determined by determining whether the input audio signal is an unvoiced signal. In this case, the sub-band SNR of the audio signal does not need to be determined when whether the audio signal is a to-be-determined audio signal is being determined. In other words, step 201 does not need to be performed in this case. Specifically, the determining an input audio signal as a to-be-determined audio signal includes: determining the audio signal as a to-be-determined audio signal in a case in which it is determined that the audio signal is an unvoiced signal. Specifically, a person skilled in the art may understand that there may be multiple methods for detecting whether the audio signal is an unvoiced signal. For example, whether the audio signal is an unvoiced signal may be determined by detecting a time-domain ZCR of the audio signal. Specifically, in a case in which the ZCR of the audio signal is greater than a ZCR threshold, it is determined that the audio signal is an unvoiced signal, where the ZCR threshold is determined according to a large quantity of experiments.

402. Acquire a reference SSNR of the audio signal.

Specifically, the reference SSNR may be an SSNR obtained through calculation by using formula 1.1.

403. Use a preset algorithm to reduce a reference VAD decision threshold, so as to obtain a reduced VAD decision threshold.

Specifically, the reference VAD decision threshold may be a default VAD decision threshold, and the reference VAD decision threshold may be pre-stored. Alternatively, the reference VAD decision threshold may be temporarily obtained through calculation, where the reference VAD decision threshold may be calculated by using an existing well-known technology. When the reference VAD decision threshold is reduced by using the preset algorithm, the preset algorithm may be multiplying the reference VAD decision threshold by a coefficient that is less than 1, or another algorithm may be used. This embodiment imposes no limitation on a used specific algorithm. The VAD decision threshold may be properly reduced by using the preset algorithm, so that an enhanced SSNR is greater than the reduced VAD decision threshold. Therefore, a proportion of misdetection of an active signal can be reduced.

404. Compare the reference SSNR with the reduced VAD decision threshold to determine whether the audio signal is an active signal.

When a conventional SSNR calculation method is used to calculate SSNRs of some audio signals, the SSNRs of these audio signals may be lower than a preset VAD decision threshold. However, actually, these audio signals are active audio signals. This is caused by features of these audio signals. For example, in a case in which an environmental SNR is relatively low, a sub-band SNR of a high-frequency part is significantly reduced. In addition, because a psychoacoustic theory is generally used to perform sub-band division, the sub-band SNR of the high-frequency part has relatively low contribution to an SSNR. In this case, for some signals, such as an unvoiced signal, whose energy is mainly centralized at a relatively high frequency part, an SSNR obtained through calculation by using the conventional SSNR calculation method may be lower than the VAD decision threshold, which causes misdetection of an active signal. For another example, for some audio signals, distribution of energy of these audio signals is relatively flat on a spectrum but overall energy of these audio signals is relatively low. Therefore, in the case in which an environmental SNR is relatively low, an SSNR obtained through calculation by using the conventional SSNR calculation method may be lower than the VAD decision threshold. In the method shown in FIG. 4, a manner of reducing a VAD decision threshold is used, so that an SSNR obtained through calculation by using the conventional SSNR calculation method is greater than the VAD decision threshold. Therefore, a proportion of misdetection of an active signal can be effectively reduced.

Figure 5:
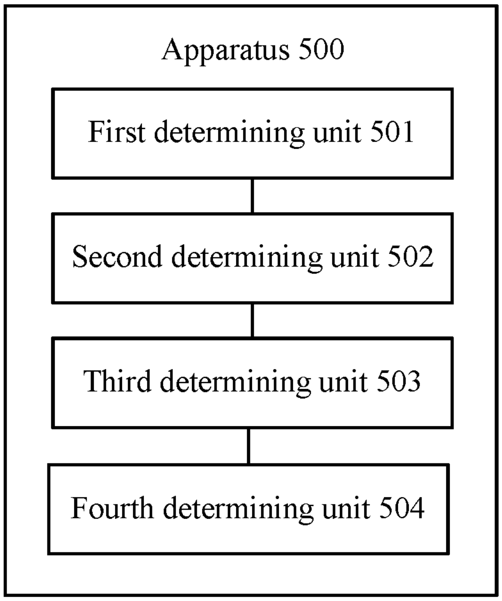
FIG. 5 is a block diagram of an apparatus according to an embodiment.

FIG. 5 is a block diagram of an apparatus according to an embodiment. The apparatus shown in FIG. 5 can perform all steps shown in FIG. 1 or FIG. 2. As shown in FIG. 5, an apparatus 500 includes a first determining unit 501, a second determining unit 502, and a third determining unit 503.

The first determining unit 501 is configured to determine an input audio signal as a to-be-determined audio signal.

The second determining unit 502 is configured to determine an enhanced segmental signal-to-noise ratio (SSNR) of the audio signal, where the enhanced SSNR is greater than a reference SSNR.

The third determining unit 503 is configured to compare the enhanced SSNR with a voice activity detection (VAD) decision threshold to determine whether the audio signal is an active signal.

The apparatus 500 shown in FIG. 5 may determine a feature of an input audio signal, determine an enhanced SSNR in a corresponding manner according to the feature of the audio signal, and compare the enhanced SSNR with a VAD decision threshold, so that a proportion of misdetection of an active signal can be reduced.

Optionally, in an embodiment, the first determining unit 501 is configured to determine the audio signal as a to-be-determined audio signal according to a sub-band SNR of the audio signal.

Optionally, in an embodiment, in a case in which the first determining unit 501 determines the audio signal as a to-be-determined audio signal according to the sub-band SNR of the audio signal, the first determining unit 501 is configured to determine the audio signal as a to-be-determined audio signal in a case in which a quantity of high-frequency end sub-bands that are in the audio signal and whose sub-band SNRs are greater than a first preset threshold is greater than a first quantity.

Optionally, in another embodiment, in a case in which the first determining unit 501 determines the audio signal as a to-be-determined audio signal according to the sub-band SNR of the audio signal, the first determining unit 501 is configured to determine the audio signal as a to-be-determined audio signal in a case in which a quantity of high-frequency end sub-bands that are in the audio signal and whose sub-band SNRs are greater than a first preset threshold is greater than a second quantity, and a quantity of low-frequency end sub-bands that are in the audio signal and whose sub-band SNRs are less than a second preset threshold is greater than a third quantity.

Optionally, in another embodiment, in a case in which the first determining unit 501 determines the audio signal as a to-be-determined audio signal according to the sub-band SNR of the audio signal, the first determining unit 501 is configured to determine the audio signal as a to-be-determined audio signal in a case in which a quantity of sub-bands that are in the audio signal and whose values of sub-band SNRs are greater than a third preset threshold is greater than a fourth quantity.

Optionally, in another embodiment, the first determining unit 501 is configured to determine the audio signal as a to-be-determined audio signal in a case in which it is determined that the audio signal is an unvoiced signal. Specifically, a person skilled in the art may understand that there may be multiple methods for detecting whether the audio signal is an unvoiced signal. For example, whether the audio signal is an unvoiced signal may be determined by detecting a time-domain ZCR of the audio signal. Specifically, in a case in which the ZCR of the audio signal is greater than a ZCR threshold, it is determined that the audio signal is an unvoiced signal, where the ZCR threshold is determined according to a large quantity of experiments.

The first preset threshold and the second preset threshold may be obtained by means of statistics collection according to a large quantity of voice samples. Specifically, statistics about sub-band SNRs of high-frequency end sub-bands are collected in a large quantity of unvoiced samples including background noise, and the first preset threshold is determined according to the sub-band SNRs, so that sub-band SNRs of most of the high-frequency end sub-bands in these unvoiced samples are greater than the first preset threshold. Similarly, statistics about sub-band SNRs of low-frequency end sub-bands are collected in these unvoiced samples, and the second preset threshold is determined according to the sub-band SNRs, so that sub-band SNRs of most of the low-frequency end sub-bands in these unvoiced samples are less than the second preset threshold.

The third preset threshold is also obtained by means of statistics collection. Specifically, the third preset threshold is determined according to sub-band SNRs of a large quantity of noise signals, so that sub-band SNRs of most of sub-bands in these noise signals are less than the third preset threshold.

The first quantity, the second quantity, the third quantity, and the fourth quantity are also obtained by means of statistics collection. The first quantity is used as an example, where in a large quantity of voice samples including noise, statistics about a sub-band quantity of high-frequency end sub-bands whose sub-band SNRs are greater than the first preset threshold are collected, and the first quantity is determined according to the quantity, so that a quantity of high-frequency end sub-bands that are in most of these voice samples and whose sub-band SNRs are greater than the first preset threshold is greater than the first quantity. A method for determining the second quantity is similar to a method for determining the first quantity. The second quantity may be the same as the first quantity, or may be different from the first quantity. Similarly, for the third quantity, in the large quantity of voice samples including noise, statistics about a sub-band quantity of low-frequency end sub-bands whose sub-band SNRs are greater than the second preset threshold are collected, and the third quantity is determined according to the quantity, so that a quantity of low-frequency end sub-bands that are in most of these voice samples and whose sub-band SNRs are greater than the second preset threshold is greater than the third quantity. For the fourth quantity, in the large quantity of voice samples including noise, statistics about a quantity of sub-bands whose sub-band SNRs are greater than the third preset threshold are collected, and the fourth quantity is determined according to the quantity, so that a quantity of sub-bands that are in most of these voice samples and whose sub-band SNRs are greater than the third preset threshold is greater than the fourth quantity.

Further, the second determining unit 502 is configured to determine a weight of a sub-band SNR of each sub-band in the audio signal, where a weight of a high-frequency end sub-band whose sub-band SNR is greater than the first preset threshold is greater than a weight of a sub-band SNR of another sub-band, and determine the enhanced SSNR according to the SNR of each sub-band and the weight of the sub-band SNR of each sub-band in the audio signal.

Optionally, in an embodiment, the second determining unit 502 is configured to determine a reference SSNR of the audio signal, and determine the enhanced SSNR according to the reference SSNR of the audio signal.

The reference SSNR may be an SSNR obtained through calculation by using formula 1.1. When the reference SSNR is being calculated, weights of sub-band SNRs that are of all sub-bands and that are included in the SSNR are the same in the SSNR.

Optionally, in another embodiment, the second determining unit 502 is configured to determine the enhanced SSNR by using the following formula:

$$SSNR'=x*SSNR+y \quad \text{Formula 1.7}$$

where SSNR indicates the reference SSNR, SSNR' indicates the enhanced SSNR, and x and y indicate enhancement parameters. For example, a value of x may be 1.05, and a value of y may be 1. A person skilled in the art may understand that, values of x and y may be other proper values that make the enhanced SSNR greater than the reference SSNR properly.

Optionally, in another embodiment, the second determining unit 502 is configured to determine the enhanced SSNR by using the following formula:

$$SSNR'=f(x)*SSNR+h(y) \quad \text{Formula 1.8}$$

where SSNR indicates the reference SSNR, SSNR' indicates the enhanced SSNR, and f(x) and h(y) indicate enhancement functions. For example, f(x) and h(y) may be functions related to a LSNR of the audio signal, where the LSNR of the audio signal is an average SNR or a weighted SNR within a relatively long period of time. For example, when the lsnr is greater than 20, f(lsnr) may be equal to 1.1, and y(lsnr) may be equal to 2; when the lsnr is less than 20 and greater than 15, f(lsnr) may be equal to 1.05, and y(lsnr) may be equal to 1; and when the lsnr is less than 15, f(lsnr) may be equal to 1, and y(lsnr) may be equal to 0. A person skilled in the art may understand that, f(x) and h(y) may be in other proper forms that make the enhanced SSNR greater than the reference SSNR properly.

The third determining unit 503 is configured to compare the enhanced SSNR with the VAD decision threshold to determine, according to a result of the comparison, whether the audio signal is an active signal. Specifically, if the enhanced SSNR is greater than the VAD decision threshold, it is determined that the audio signal is an active signal, or if the enhanced SSNR is less than the VAD decision threshold, it is determined that the audio signal is an inactive signal.

Optionally, in another embodiment, a preset algorithm may also be used to reduce a reference VAD decision threshold to obtain a reduced VAD decision threshold, and the reduced VAD decision threshold is used to determine whether the audio signal is an active signal. In this case, the apparatus 500 may further include a fourth determining unit 504, where the fourth determining unit 504 is configured to use a preset algorithm to reduce the VAD decision threshold, so as to obtain a reduced VAD decision threshold. In this case, the third determining unit 503 is configured to compare the enhanced SSNR with the reduced VAD decision threshold to determine whether the audio signal is an active signal.

Figure 6:
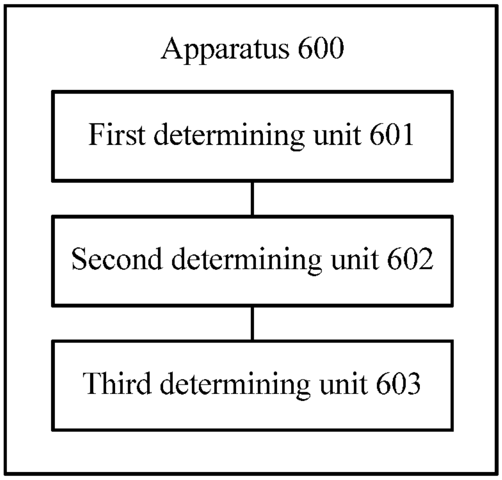
FIG. 6 is a block diagram of another apparatus according to an embodiment.

FIG. 6 is a block diagram of another apparatus according to an embodiment. The apparatus shown in FIG. 6 can perform all steps shown in FIG. 3. As shown in FIG. 6, an apparatus 600 includes a first determining unit 601, a second determining unit 602, and a third determining unit 603.

The first determining unit 601 is configured to determine an input audio signal as a to-be-determined audio signal.

The second determining unit 602 is configured to determine a weight of a sub-band SNR of each sub-band in the audio signal, where a weight of a sub-band SNR of a high-frequency end sub-band whose sub-band SNR is greater than a first preset threshold is greater than a weight of a sub-band SNR of another sub-band, and determine an enhanced SSNR according to the sub-band SNR of each sub-band and the weight of the sub-band SNR of each sub-band in the audio signal, where the enhanced SSNR is greater than a reference SSNR.

The third determining unit 603 is configured to compare the enhanced SSNR with a VAD decision threshold to determine whether the audio signal is an active signal.

The apparatus 600 shown in FIG. 6 may determine a feature of an input audio signal, determine an enhanced SSNR in a corresponding manner according to the feature of the audio signal, and compare the enhanced SSNR with a VAD decision threshold, so that a proportion of misdetection of an active signal can be reduced.

Further, the first determining unit 601 is configured to determine the audio signal as a to-be-determined audio signal according to a sub-band SNR of the audio signal.

Optionally, in an embodiment, the first determining unit 601 is configured to determine the audio signal as a to-be-determined audio signal in a case in which a quantity of high-frequency end sub-bands that are in the audio signal and whose sub-band SNRs are greater than the first preset threshold is greater than a first quantity.

Optionally, in another embodiment, the first determining unit 601 is configured to determine the audio signal as a to-be-determined audio signal in a case in which a quantity of high-frequency end sub-bands that are in the audio signal and whose sub-band SNRs are greater than the first preset threshold is greater than a second quantity, and a quantity of low-frequency end sub-bands that are in the audio signal and whose sub-band SNRs are less than a second preset threshold is greater than a third quantity.

The first preset threshold and the second preset threshold may be obtained by means of statistics collection according to a large quantity of voice samples. Specifically, statistics about sub-band SNRs of high-frequency end sub-bands are collected in a large quantity of unvoiced samples including background noise, and the first preset threshold is determined according to the sub-band SNRs, so that sub-band SNRs of most of the high-frequency end sub-bands in these unvoiced samples are greater than the first preset threshold. Similarly, statistics about sub-band SNRs of low-frequency end sub-bands are collected in these unvoiced samples, and the second preset threshold is determined according to the sub-band SNRs, so that sub-band SNRs of most of the low-frequency end sub-bands in these unvoiced samples are less than the second preset threshold.

The first quantity, the second quantity, and the third quantity are also obtained by means of statistics collection. The first quantity is used as an example, where in a large quantity of unvoiced sample frames including noise, statistics about a sub-band quantity of high-frequency end sub-bands whose sub-band SNRs are greater than the first preset threshold are collected, and the first quantity is determined according to the quantity, so that a quantity of high-frequency end sub-bands that are in most of these unvoiced sample frames and whose sub-band SNRs are greater than the first preset threshold is greater than the first quantity. A method for acquiring the second quantity is similar to a method for acquiring the first quantity. The second quantity may be the same as the first quantity, or the second quantity may be different from the first quantity. Similarly, for the third quantity, in the large quantity of unvoiced sample frames including noise, statistics about a sub-band quantity of low-frequency end sub-bands whose sub-band SNRs are less than the second preset threshold are collected, and the third quantity is determined according to the quantity, so that a quantity of low-frequency end sub-bands that are in most of these unvoiced sample frames and whose sub-band SNRs are less than the second preset threshold is greater than the third quantity.

Figure 7:
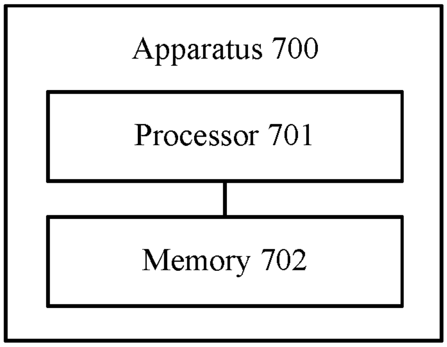
FIG. 7 is a block diagram of an apparatus according to an embodiment.

FIG. 7 is a block diagram of an apparatus according to an embodiment. The apparatus shown in FIG. 7 can perform all steps shown in FIG. 1 or FIG. 2. As shown in FIG. 7, an apparatus 700 includes a processor 701 and a memory 702. The processor 701 may be a general-purpose processor, a digital signal processor (DSP), an application specific integrated circuit (ASIC), a field programmable gate array (FPGA) or another programmable logic component, a discrete gate or a transistor logic component, or a discrete hardware component, which may implement or perform the methods, the steps, and the logical block diagrams disclosed in the embodiments. The general-purpose processor may be a microprocessor or the processor may be any conventional processor or the like. The steps of the methods disclosed in the embodiments may be directly executed by a hardware decoding processor, or executed by a combination of hardware and software modules in a decoding processor. The software module may be located in a mature storage medium in the art, such as a random access memory (RAM), a flash memory, a read-only memory (ROM), a programmable read-only memory, an electrically-erasable programmable memory, or a register. The storage medium is located in the memory 702. The processor 701 reads an instruction from the memory 702, and completes the steps of the foregoing methods in combination with the hardware.

The processor 701 is configured to determine an input audio signal as a to-be-determined audio signal.

The processor 701 is configured to determine an enhanced SSNR of the audio signal, where the enhanced SSNR is greater than a reference SSNR.

The processor 701 is configured to compare the enhanced SSNR with a VAD decision threshold to determine whether the audio signal is an active signal.

The apparatus 700 shown in FIG. 7 may determine a feature of an input audio signal, determine an enhanced SSNR in a corresponding manner according to the feature of the audio signal, and compare the enhanced SSNR with a VAD decision threshold, so that a proportion of misdetection of an active signal can be reduced.

Optionally, in an embodiment, the processor 701 is configured to determine the audio signal as a to-be-determined audio signal according to a sub-band SNR of the audio signal.

Optionally, in an embodiment, in a case in which the processor 701 determines the audio signal as a to-be-determined audio signal according to the sub-band SNR of the audio signal, the processor 701 is configured to determine the audio signal as a to-be-determined audio signal in a case in which a quantity of high-frequency end sub-bands that are in the audio signal and whose sub-band SNRs are greater than a first preset threshold is greater than a first quantity.

Optionally, in another embodiment, in a case in which the processor 701 determines the audio signal as a to-be-determined audio signal according to the sub-band SNR of the audio signal, the processor 701 is configured to determine the audio signal as a to-be-determined audio signal in a case in which a quantity of high-frequency end sub-bands that are in the audio signal and whose sub-band SNRs are greater than a first preset threshold is greater than a second quantity, and a quantity of low-frequency end sub-bands that are in the audio signal and whose sub-band SNRs are less than a second preset threshold is greater than a third quantity.

Optionally, in another embodiment, in a case in which the processor 701 determines the audio signal as a to-be-determined audio signal according to the sub-band SNR of the audio signal, the processor 701 is configured to determine the audio signal as a to-be-determined audio signal in a case in which a quantity of sub-bands that are in the audio signal and whose values of sub-band SNRs are greater than a third preset threshold is greater than a fourth quantity.

Optionally, in another embodiment, the processor 701 is configured to determine the audio signal as a to-be-determined audio signal in a case in which it is determined that the audio signal is an unvoiced signal. Specifically, a person skilled in the art may understand that there may be multiple methods for detecting whether the audio signal is an unvoiced signal. For example, whether the audio signal is an unvoiced signal may be determined by detecting a time-domain ZCR of the audio signal. Specifically, in a case in which the ZCR of the audio signal is greater than a ZCR threshold, it is determined that the audio signal is an unvoiced signal, where the ZCR threshold is determined according to a large quantity of experiments.

The first preset threshold and the second preset threshold may be obtained by means of statistics collection according to a large quantity of voice samples. Specifically, statistics about sub-band SNRs of high-frequency end sub-bands are collected in a large quantity of unvoiced samples including background noise, and the first preset threshold is determined according to the sub-band SNRs, so that sub-band SNRs of most of the high-frequency end sub-bands in these unvoiced samples are greater than the first preset threshold. Similarly, statistics about sub-band SNRs of low-frequency end sub-bands are collected in these unvoiced samples, and the second preset threshold is determined according to the sub-band SNRs, so that sub-band SNRs of most of the low-frequency end sub-bands in these unvoiced samples are less than the second preset threshold.

The third preset threshold is also obtained by means of statistics collection. Specifically, the third preset threshold is determined according to sub-band SNRs of a large quantity of noise signals, so that sub-band SNRs of most of sub-bands in these noise signals are less than the third preset threshold.

The first quantity, the second quantity, the third quantity, and the fourth quantity are also obtained by means of statistics collection. The first quantity is used as an example, where in a large quantity of voice samples including noise, statistics about a sub-band quantity of high-frequency end sub-bands whose sub-band SNRs are greater than the first preset threshold are collected, and the first quantity is determined according to the quantity, so that a quantity of high-frequency end sub-bands that are in most of these voice samples and whose sub-band SNRs are greater than the first preset threshold is greater than the first quantity. A method for determining the second quantity is similar to a method for determining the first quantity. The second quantity may be the same as the first quantity, or may be different from the first quantity. Similarly, for the third quantity, in the large quantity of voice samples including noise, statistics about a sub-band quantity of low-frequency end sub-bands whose sub-band SNRs are greater than the second preset threshold are collected, and the third quantity is determined according to the quantity, so that a quantity of low-frequency end sub-bands that are in most of these voice samples and whose sub-band SNRs are greater than the second preset threshold is greater than the third quantity. For the fourth quantity, in the large quantity of voice samples including noise, statistics about a quantity of sub-bands whose sub-band SNRs are greater than the third preset threshold are collected, and the fourth quantity is determined according to the quantity, so that a quantity of sub-bands that are in most of these voice samples and whose sub-band SNRs are greater than the third preset threshold is greater than the fourth quantity.

Further, the processor 701 is configured to determine a weight of a sub-band SNR of each sub-band in the audio signal, where a weight of a high-frequency end sub-band whose sub-band SNR is greater than the first preset threshold is greater than a weight of a sub-band SNR of another sub-band, and determine the enhanced SSNR according to the SNR of each sub-band and the weight of the sub-band SNR of each sub-band in the audio signal.

Optionally, in an embodiment, the processor 701 is configured to determine a reference SSNR of the audio signal, and determine the enhanced SSNR according to the reference SSNR of the audio signal.

The reference SSNR may be an SSNR obtained through calculation by using formula 1.1. When the reference SSNR is being calculated, weights of sub-band SNRs that are of all sub-bands and that are included in the SSNR are the same in the SSNR.

Optionally, in another embodiment, the processor 701 is configured to determine the enhanced SSNR by using the following formula:

$$SSNR' = x * SSNR + y \quad \text{Formula 1.7}$$

where SSNR indicates the reference SSNR, SSNR' indicates the enhanced SSNR, and x and y indicate enhancement parameters. For example, a value of x may be 1.07, and a value of y may be 1. A person skilled in the art may understand that, values of x and y may be other proper values that make the enhanced SSNR greater than the reference SSNR properly.

Optionally, in another embodiment, the processor 701 is configured to determine the enhanced SSNR by using the following formula:

$$SSNR' = f(x) * SSNR + h(y) \quad \text{Formula 1.8}$$

where SSNR indicates the reference SSNR, SSNR' indicates the enhanced SSNR, and f(x) and h(y) indicate enhancement functions. For example, f(x) and h(y) may be functions related to a LSNR of the audio signal, where the LSNR of the audio signal is an average SNR or a weighted SNR within a relatively long period of time. For example, when the lsnr is greater than 20, f(lsnr) may be equal to 1.1, and y(lsnr) may be equal to 2; when the lsnr is less than 20 and greater than 17, f(lsnr) may be equal to 1.07, and y(lsnr) may be equal to 1; and when the lsnr is less than 17, f(lsnr) may be equal to 1, and y(lsnr) may be equal to 0. A person skilled in the art may understand that, f(x) and h(y) may be in other proper forms that make the enhanced SSNR greater than the reference SSNR properly.

The processor 701 is configured to compare the enhanced SSNR with the VAD decision threshold to determine, according to a result of the comparison, whether the audio signal is an active signal. Specifically, if the enhanced SSNR is greater than the VAD decision threshold, it is determined that the audio signal is an active signal, or if the enhanced SSNR is less than the VAD decision threshold, it is determined that the audio signal is an inactive signal.

Optionally, in another embodiment, a preset algorithm may also be used to reduce a reference VAD decision threshold to obtain a reduced VAD decision threshold, and the reduced VAD decision threshold is used to determine whether the audio signal is an active signal. In this case, the processor 701 may be further configured to use a preset algorithm to reduce the VAD decision threshold, so as to obtain a reduced VAD decision threshold. In this case, the processor 701 is configured to compare the enhanced SSNR with the reduced VAD decision threshold to determine whether the audio signal is an active signal.

Figure 8:
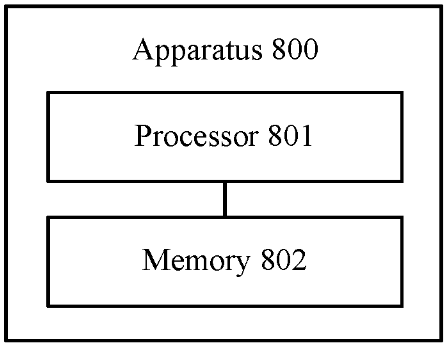
FIG. 8 is a block diagram of another apparatus according to an embodiment.

FIG. 8 is a block diagram of another apparatus according to an embodiment. The apparatus shown in FIG. 8 can perform all steps shown in FIG. 3. As shown in FIG. 8, an apparatus 800 includes a processor 801 and a memory 802. The processor 801 may be a general-purpose processor, a DSP, an ASIC, a FPGA or another programmable logic component, a discrete gate or a transistor logic component, or a discrete hardware component, which may implement or perform the methods, the steps, and the logical block diagrams disclosed in the embodiments. The general-purpose processor may be a microprocessor or the processor may be any conventional processor, or the like. The steps of the methods disclosed in the embodiments may be directly executed by a hardware decoding processor, or executed by a combination of hardware and software modules in a decoding processor. The software module may be located in a mature storage medium in the art, such as a RAM, a flash memory, a ROM, a programmable read-only memory, an electrically-erasable programmable memory, or a register. The storage medium is located in the memory 802. The processor 801 reads an instruction from the memory 802, and completes the steps of the foregoing methods in combination with the hardware.

The processor 801 is configured to determine an input audio signal as a to-be-determined audio signal.

The processor 801 is configured to determine a weight of a sub-band signal-to-noise ratio SNR of each sub-band in the audio signal, where a weight of a sub-band SNR of a high-frequency end sub-band whose sub-band SNR is greater than a first preset threshold is greater than a weight of a sub-band SNR of another sub-band, and determine an enhanced segmental signal-to-noise ratio SSNR according to the sub-band SNR of each sub-band and the weight of the sub-band SNR of each sub-band in the audio signal, where the enhanced SSNR is greater than a reference SSNR.

The processor 801 is configured to compare the enhanced SSNR with a VAD decision threshold to determine whether the audio signal is an active signal.

The apparatus 800 shown in FIG. 8 may determine a feature of an input audio signal, determine an enhanced SSNR in a corresponding manner according to the feature of the audio signal, and compare the enhanced SSNR with a VAD decision threshold, so that a proportion of misdetection of an active signal can be reduced.

Further, the processor 801 is configured to determine the audio signal as a to-be-determined audio signal according to a sub-band signal-to-noise ratio SNR of the audio signal.

Optionally, in an embodiment, the processor 801 is configured to determine the audio signal as a to-be-determined audio signal in a case in which a quantity of high-frequency end sub-bands that are in the audio signal and whose sub-band signal-to-noise ratios SNRs are greater than the first preset threshold is greater than a first quantity.

Optionally, in another embodiment, the processor 801 is configured to determine the audio signal as a to-be-determined audio signal in a case in which a quantity of high-frequency end sub-bands that are in the audio signal and whose sub-band SNRs are greater than the first preset threshold is greater than a second quantity, and a quantity of low-frequency end sub-bands that are in the audio signal and whose sub-band SNRs are less than a second preset threshold is greater than a third quantity.

The first preset threshold and the second preset threshold may be obtained by means of statistics collection according to a large quantity of voice samples. Specifically, statistics about sub-band SNRs of high-frequency end sub-bands are collected in a large quantity of unvoiced samples including background noise, and the first preset threshold is determined according to the sub-band SNRs, so that sub-band SNRs of most of the high-frequency end sub-bands in these unvoiced samples are greater than the first preset threshold. Similarly, statistics about sub-band SNRs of low-frequency end sub-bands are collected in these unvoiced samples, and the second preset threshold is determined according to the sub-band SNRs, so that sub-band SNRs of most of the low-frequency end sub-bands in these unvoiced samples are less than the second preset threshold.

The first quantity, the second quantity, and the third quantity are also obtained by means of statistics collection. The first quantity is used as an example, where in a large quantity of unvoiced sample frames including noise, statistics about a sub-band quantity of high-frequency end sub-bands whose sub-band SNRs are greater than the first preset threshold are collected, and the first quantity is determined according to the quantity, so that a quantity of high-frequency end sub-bands that are in most of these unvoiced sample frames and whose sub-band SNRs are greater than the first preset threshold is greater than the first quantity. A method for acquiring the second quantity is similar to a method for acquiring the first quantity. The second quantity may be the same as the first quantity, or the second quantity may be different from the first quantity. Similarly, for the third quantity, in the large quantity of unvoiced sample frames including noise, statistics about a sub-band quantity of low-frequency end sub-bands whose sub-band SNRs are less than the second preset threshold are collected, and the third quantity is determined according to the quantity, so that a quantity of low-frequency end sub-bands that are in most of these unvoiced sample frames and whose sub-band SNRs are less than the second preset threshold is greater than the third quantity.

Figure 9:
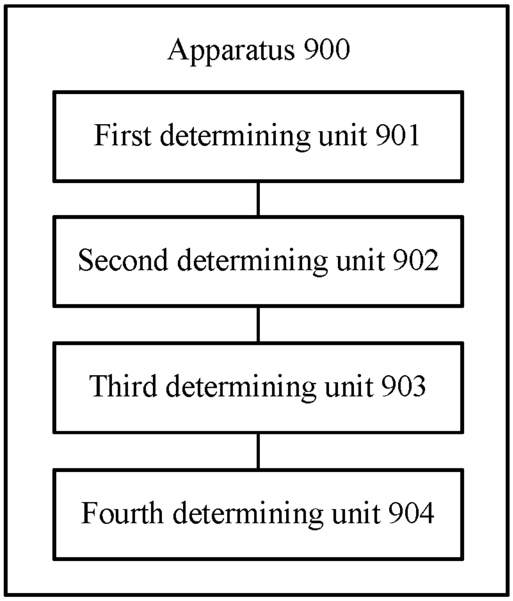
FIG. 9 is a block diagram of another apparatus according to an embodiment.

FIG. 9 is a block diagram of another apparatus according to an embodiment. An apparatus 900 shown in FIG. 9 can perform all steps shown in FIG. 4.

As shown in FIG. 9, the apparatus 900 includes a first determining unit 901, a second determining unit 902, a third determining unit 903, and a fourth determining unit 904.

The first determining unit 901 is configured to determine an input audio signal as a to-be-determined audio signal.

The second determining unit 902 is configured to acquire a reference SSNR of the audio signal.

Specifically, the reference SSNR may be an SSNR obtained through calculation by using formula 1.1.

The third determining unit 903 is configured to use a preset algorithm to reduce a reference VAD decision threshold, so as to obtain a reduced VAD decision threshold.

Specifically, the reference VAD decision threshold may be a default VAD decision threshold, and the reference VAD decision threshold may be pre-stored, or may be temporarily obtained through calculation, where the reference VAD decision threshold may be calculated by using an existing well-known technology. When the reference VAD decision threshold is reduced by using the preset algorithm, the preset algorithm may be multiplying the reference VAD decision threshold by a coefficient that is less than 1, or another algorithm may be used. This embodiment imposes no limitation on a used specific algorithm. The VAD decision threshold may be properly reduced by using the preset algorithm, so that the enhanced SSNR is greater than the reduced VAD decision threshold. Therefore, a proportion of misdetection of an active signal can be reduced.

The fourth determining unit 904 is configured to compare the reference SSNR with the reduced VAD decision threshold to determine whether the audio signal is an active signal.

Optionally, in an embodiment, the first determining unit 901 is configured to determine the audio signal as a to-be-determined audio signal according to a sub-band SNR of the audio signal.

Optionally, in an embodiment, in a case in which the first determining unit 901 determines the audio signal as a to-be-determined audio signal according to the sub-band SNR of the audio signal, the first determining unit 901 is configured to determine the audio signal as a to-be-determined audio signal in a case in which a quantity of high-frequency end sub-bands that are in the audio signal and whose sub-band SNRs are greater than a first preset threshold is greater than a first quantity.

Optionally, in an embodiment, in a case in which the first determining unit 901 determines the audio signal as a to-be-determined audio signal according to the sub-band SNR of the audio signal, the first determining unit 901 is configured to determine the audio signal as a to-be-determined audio signal in a case in which a quantity of high-frequency end sub-bands that are in the audio signal and whose sub-band SNRs are greater than a first preset threshold is greater than a second quantity, and a quantity of low-frequency end sub-bands that are in the audio signal and whose sub-band SNRs are less than a second preset threshold is greater than a third quantity.

Optionally, in an embodiment, in a case in which the first determining unit 901 determines the audio signal as a to-be-determined audio signal according to the sub-band SNR of the audio signal, the first determining unit 901 is configured to determine the audio signal as a to-be-determined audio signal in a case in which a quantity of sub-bands that are in the audio signal and whose values of sub-band SNRs are greater than a third preset threshold is greater than a fourth quantity.

Optionally, in an embodiment, the first determining unit 901 is configured to determine the audio signal as a to-be-determined audio signal in a case in which it is determined that the audio signal is an unvoiced signal. Specifically, a person skilled in the art may understand that there may be multiple methods for detecting whether the audio signal is an unvoiced signal. For example, whether the audio signal is an unvoiced signal may be determined by detecting a ZCR of the audio signal. Specifically, in a case in which the ZCR of the audio signal is greater than a ZCR threshold, it is determined that the audio signal is an unvoiced signal, where the ZCR threshold is determined according to a large quantity of experiments.

The first preset threshold and the second preset threshold may be obtained by means of statistics collection according to a large quantity of voice samples. Specifically, statistics about sub-band SNRs of high-frequency end sub-bands are collected in a large quantity of unvoiced samples including background noise, and the first preset threshold is determined according to the sub-band SNRs, so that sub-band SNRs of most of the high-frequency end sub-bands in these unvoiced samples are greater than the first preset threshold. Similarly, statistics about sub-band SNRs of low-frequency end sub-bands are collected in these unvoiced samples, and the second preset threshold is determined according to the sub-band SNRs, so that sub-band SNRs of most of the low-frequency end sub-bands in these unvoiced samples are less than the second preset threshold.

The third preset threshold is also obtained by means of statistics collection. Specifically, the third preset threshold is determined according to sub-band SNRs of a large quantity of noise signals, so that sub-band SNRs of most of sub-bands in these noise signals are less than the third preset threshold.

The first quantity, the second quantity, the third quantity, and the fourth quantity are also obtained by means of statistics collection. The first quantity is used as an example, where in a large quantity of voice samples including noise, statistics about a sub-band quantity of high-frequency end sub-bands whose sub-band SNRs are greater than the first preset threshold are collected, and the first quantity is determined according to the quantity, so that a quantity of high-frequency end sub-bands that are in most of these voice samples and whose sub-band SNRs are greater than the first preset threshold is greater than the first quantity. A method for determining the second quantity is similar to a method for determining the first quantity. The second quantity may be the same as the first quantity, or may be different from the first quantity. Similarly, for the third quantity, in the large quantity of voice samples including noise, statistics about a sub-band quantity of low-frequency end sub-bands whose sub-band SNRs are greater than the second preset threshold are collected, and the third quantity is determined according to the quantity, so that a quantity of low-frequency end sub-bands that are in most of these voice samples and whose sub-band SNRs are greater than the second preset threshold is greater than the third quantity. For the fourth quantity, in the large quantity of voice samples including noise, statistics about a quantity of sub-bands whose sub-band SNRs are greater than the third preset threshold are collected, and the fourth quantity is determined according to the quantity, so that a quantity of sub-bands that are in most of these voice samples and whose sub-band SNRs are greater than the third preset threshold is greater than the fourth quantity.

The apparatus 900 shown in FIG. 9 may determine a feature of an input audio signal, reduce a reference VAD decision threshold according to the feature of the audio signal, and compare an enhanced SSNR with a reduced VAD decision threshold, so that a proportion of misdetection of an active signal can be reduced.

Figure 10:
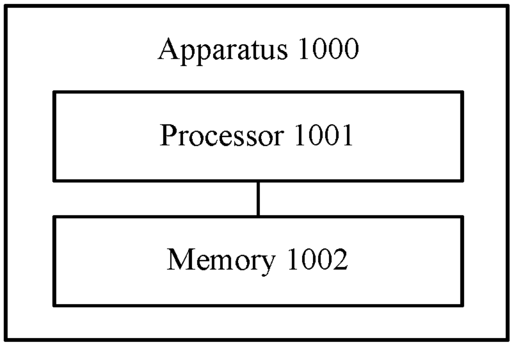
FIG. 10 is a block diagram of another apparatus according to an embodiment.

FIG. 10 is a block diagram of another apparatus according to an embodiment. An apparatus 1000 shown in FIG. 10 can perform all steps shown in FIG. 4. As shown in FIG. 10, the apparatus 1000 includes a processor 1001 and a memory 1002. The processor 1001 may be a general-purpose processor, a DSP, an ASIC, a FPGA or another programmable logic component, a discrete gate or a transistor logic component, or a discrete hardware component, which may implement or perform the methods, the steps, and the logical block diagrams disclosed in the embodiments. The general-purpose processor may be a microprocessor or the processor may be any conventional processor or the like. The steps of the methods disclosed in the embodiments may be directly executed by a hardware decoding processor, or executed by a combination of hardware and software modules in a decoding processor. The software module may be located in a mature storage medium in the art, such as a RAM, a flash memory, a ROM, a programmable read-only memory, an electrically-erasable programmable memory, or a register. The storage medium is located in the memory 1002. The processor 1001 reads an instruction from the memory 1002, and completes the steps of the foregoing methods in combination with the hardware.

The processor 1001 is configured to determine an input audio signal as a to-be-determined audio signal.

The processor 1001 is configured to acquire a reference SSNR of the audio signal.

Specifically, the reference SSNR may be an SSNR obtained through calculation by using formula 1.1.

The processor 1001 is configured to use a preset algorithm to reduce a reference VAD decision threshold, so as to obtain a reduced VAD decision threshold.

Specifically, the reference VAD decision threshold may be a default VAD decision threshold, and the reference VAD decision threshold may be pre-stored, or may be temporarily obtained through calculation, where the reference VAD decision threshold may be calculated by using an existing well-known technology. When the reference VAD decision threshold is reduced by using the preset algorithm, the preset algorithm may be multiplying the reference VAD decision threshold by a coefficient that is less than 1, or another algorithm may be used. This embodiment of imposes no limitation on a used specific algorithm. The VAD decision threshold may be properly reduced by using the preset algorithm, so that an enhanced SSNR is greater than the reduced VAD decision threshold. Therefore, a proportion of misdetection of an active signal can be reduced.

The processor 1001 is configured to compare the reference SSNR with the reduced VAD decision threshold to determine whether the audio signal is an active signal.

Optionally, in an embodiment, the processor 1001 is configured to determine the audio signal as a to-be-determined audio signal according to a sub-band SNR of the audio signal.

Optionally, in an embodiment, in a case in which the processor 1001 determines the audio signal as a to-be-determined audio signal according to the sub-band SNR of the audio signal, the processor 1001 is configured to determine the audio signal as a to-be-determined audio signal in a case in which a quantity of high-frequency end sub-bands that are in the audio signal and whose sub-band SNRs are greater than a first preset threshold is greater than a first quantity.

Optionally, in an embodiment, in a case in which the processor 1001 determines the audio signal as a to-be-determined audio signal according to the sub-band SNR of the audio signal, the processor 1001 is configured to determine the audio signal as a to-be-determined audio signal in a case in which a quantity of high-frequency end sub-bands that are in the audio signal and whose sub-band SNRs are greater than a first preset threshold is greater than a second quantity, and a quantity of low-frequency end sub-bands that are in the audio signal and whose sub-band SNRs are less than a second preset threshold is greater than a third quantity.

Optionally, in an embodiment, in a case in which the processor 1001 determines the audio signal as a to-be-determined audio signal according to the sub-band SNR of the audio signal, the processor 1001 is configured to determine the audio signal as a to-be-determined audio signal in a case in which a quantity of sub-bands that are in the audio signal and whose values of sub-band SNRs are greater than a third preset threshold is greater than a fourth quantity.

Optionally, in an embodiment, the processor 1001 is configured to determine the audio signal as a to-be-determined audio signal in a case in which it is determined that the audio signal is an unvoiced signal. Specifically, a person skilled in the art may understand that there may be multiple methods for detecting whether the audio signal is an unvoiced signal. For example, whether the audio signal is an unvoiced signal may be determined by detecting a ZCR of the audio signal. Specifically, in a case in which the ZCR of the audio signal is greater than a ZCR threshold, it is determined that the audio signal is an unvoiced signal, where the ZCR threshold is determined according to a large quantity of experiments.

The first preset threshold and the second preset threshold may be obtained by means of statistics collection according to a large quantity of voice samples. Specifically, statistics about sub-band SNRs of high-frequency end sub-bands are collected in a large quantity of unvoiced samples including background noise, and the first preset threshold is determined according to the sub-band SNRs, so that sub-band SNRs of most of the high-frequency end sub-bands in these unvoiced samples are greater than the first preset threshold. Similarly, statistics about sub-band SNRs of low-frequency end sub-bands are collected in these unvoiced samples, and the second preset threshold is determined according to the sub-band SNRs, so that sub-band SNRs of most of the low-frequency end sub-bands in these unvoiced samples are less than the second preset threshold.

The third preset threshold is also obtained by means of statistics collection. Specifically, the third preset threshold is determined according to sub-band SNRs of a large quantity of noise signals, so that sub-band SNRs of most of sub-bands in these noise signals are less than the third preset threshold.

The first quantity, the second quantity, the third quantity, and the fourth quantity are also obtained by means of statistics collection. The first quantity is used as an example, where in a large quantity of voice samples including noise, statistics about a sub-band quantity of high-frequency end sub-bands whose sub-band SNRs are greater than the first preset threshold are collected, and the first quantity is determined according to the quantity, so that a quantity of high-frequency end sub-bands that are in most of these voice samples and whose sub-band SNRs are greater than the first preset threshold is greater than the first quantity. A method for determining the second quantity is similar to a method for determining the first quantity. The second quantity may be the same as the first quantity, or may be different from the first quantity. Similarly, for the third quantity, in the large quantity of voice samples including noise, statistics about a sub-band quantity of low-frequency end sub-bands whose sub-band SNRs are greater than the second preset threshold are collected, and the third quantity is determined according to the quantity, so that a quantity of low-frequency end sub-bands that are in most of these voice samples and whose sub-band SNRs are greater than the second preset threshold is greater than the third quantity. For the fourth quantity, in the large quantity of voice samples including noise, statistics about a quantity of sub-bands whose sub-band SNRs are greater than the third preset threshold are collected, and the fourth quantity is determined according to the quantity, so that a quantity of sub-bands that are in most of these voice samples and whose sub-band SNRs are greater than the third preset threshold is greater than the fourth quantity.

The apparatus 1000 shown in FIG. 10 may determine a feature of an input audio signal, reduce a reference VAD decision threshold according to the feature of the audio signal, and compare an enhanced SSNR with a reduced VAD decision threshold, so that a proportion of misdetection of an active signal can be reduced.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments disclosed herein may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments. The foregoing storage medium includes: any medium that can store program code, such as a USB flash drive, a removable hard disk, a ROM, a RAM, a magnetic disk, or an optical disc.

The foregoing descriptions are merely specific embodiments, and are not intended to limit the protection scope. Any variation or replacement readily figured out by a person skilled in the art within the technical scope disclosed in the disclosed embodiments shall fall within the protection scope.

What is claimed is:

1. A method for detecting an audio signal, wherein the method is used by a signal detecting apparatus comprising a processor and a memory, and the method comprises:

determining that an input audio signal is an unvoiced signal;

determining an enhanced segmental signal-to-noise ratio (SSNR) of the audio signal, wherein the enhanced SSNR is greater than a reference SSNR; and comparing the enhanced SSNR with a voice activity detection (VAD) decision threshold to determine whether the audio signal is an active signal, wherein the determining the enhanced SSNR comprises: determining the enhanced SSNR using the formula $$SSNR' = x*SSNR + y,$$

wherein SSNR indicates the reference SSNR, SSNR' indicates the enhanced SSNR, and x and y indicate enhancement parameters.

2. The method according to claim 1, wherein the input audio signal comprises 20 sub-bands, the 20 sub-bands are from sub-band 0 to sub-band 19, and sub-band SNRs of sub-band 18 and sub-band 19 are greater than a first preset threshold.

3. A method for detecting an audio signal, wherein the method is used by a signal detecting apparatus comprising a processor and a memory, and the method comprises:

determining that an input audio signal is an unvoiced signal;

determining a weight of each signal-to-noise ratio (SNR) of each sub-band in the audio signal, wherein a first weight of a SNR of a high-frequency end sub-band, wherein the SNR of the high-frequency end sub-band is greater than a first preset threshold, is greater than a second weight of a SNR of a second sub-band, wherein the second sub-band is one of sub-bands except the high-frequency end sub-band in the audio signal;

determining an enhanced segmental signal-to-noise ratio (SSNR) according to each SNR of each sub-band and each weight of each SNR of each sub-band in the audio signal, wherein the enhanced SSNR is greater than a reference SSNR; and comparing the enhanced SSNR with a voice activity detection (VAD) decision threshold to determine whether the audio signal is an active signal.

4. The method according to claim 3, wherein the input audio signal comprises 20 sub-bands, the 20 sub-bands are from sub-band 0 to sub-band 19, and sub-band SNRs of sub-band 18 and sub-band 19 are greater than the first preset threshold.

5. A signal detecting apparatus, wherein the apparatus comprises:

a memory storage comprising instructions; and one or more processors in communication with the memory, wherein the one or more processors execute the instructions to:

determine that an input audio signal is an unvoiced signal;

determine an enhanced segmental signal-to-noise ratio (SSNR) of the audio signal, wherein the enhanced SSNR is greater than a reference SSNR; and compare the enhanced SSNR with a voice activity detection (VAD) decision threshold to determine whether the audio signal is an active signal, wherein the one or more processors execute the instructions to determine the enhanced SSNR using the formula $$SSNR' = x*SSNR + y,$$

wherein SSNR indicates the reference SSNR, SSNR' indicates the enhanced SSNR, and x and y indicate enhancement parameters.

6. The apparatus according to claim 5, wherein the input audio signal comprises 20 sub-bands, the 20 sub-bands are from sub-band 0 to sub-band 19, and sub-band SNRs of sub-band 18 and sub-band 19 are greater than a first preset threshold.

7. A signal detecting apparatus, wherein the apparatus comprises:

a memory storage comprising instructions; and one or more processors in communication with the memory, wherein the one or more processors execute the instructions to:

determine that an input audio signal is an unvoiced signal;

determine a weight of each signal-to-noise ratio (SNR) of each sub-band in the audio signal, wherein a first weight of a SNR of a high-frequency end sub-band, wherein the sub-band SNR is greater than a first preset threshold, is greater than a second weight of a SNR of a second sub-band, wherein the second sub-band is one of sub-bands except the high-frequency end sub-band in the audio signal, and determine an enhanced segmental signal-to-noise ratio (SSNR) according to each SNR of each sub-band and each weight of each sub-band SNR of each sub-band in the audio signal, wherein the enhanced SSNR is greater than a reference SSNR; and compare the enhanced SSNR with a voice activity detection (VAD) decision threshold to determine whether the audio signal is an active signal.

8. The apparatus according to claim 7, wherein the input audio signal comprises 20 sub-bands, the 20 sub-bands are from sub-band 0 to sub-band 19, and sub-band SNRs of sub-band 18 and sub-band 19 are greater than the first preset threshold.

* * * * *